US012311265B2

(12) United States Patent
Sangston et al.

(10) Patent No.: US 12,311,265 B2
(45) Date of Patent: May 27, 2025

(54) SYSTEMS AND METHODS FOR TRAINING A MODEL TO DETERMINE A TYPE OF ENVIRONMENT SURROUNDING A USER

(71) Applicant: Sony Interactive Entertainment Inc., Tokyo (JP)

(72) Inventors: Brandon Sangston, Foster City, CA (US); Andrew Young, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 334 days.

(21) Appl. No.: 17/541,549

(22) Filed: Dec. 3, 2021

(65) Prior Publication Data

US 2023/0173387 A1 Jun. 8, 2023

(51) Int. Cl.
*A63F 13/54* (2014.01)
*A63F 13/215* (2014.01)
*A63F 13/355* (2014.01)
*G06F 3/16* (2006.01)
*G06N 20/00* (2019.01)
*G06V 20/50* (2022.01)

(52) U.S. Cl.
CPC ............ *A63F 13/54* (2014.09); *A63F 13/215* (2014.09); *A63F 13/355* (2014.09); *G06F 3/165* (2013.01);
(Continued)

(58) Field of Classification Search
CPC ...... A63F 13/54; A63F 13/215; A63F 13/355; A63F 2300/1081; A63F 2300/538;
(Continued)

(56) References Cited

U.S. PATENT DOCUMENTS

| 8,767,968 B2 * | 7/2014 | Flaks | H04S 7/306 |
| | | | 381/310 |
| 11,551,407 B1 * | 1/2023 | Stanney | A63F 13/525 |

(Continued)

FOREIGN PATENT DOCUMENTS

WO  WO-2021216060 A1 * 10/2021  ....... G10K 11/17823

OTHER PUBLICATIONS

PCT/US2022/050499, Notification of Transmittal of the International Search Report and the Written Opinion of the International Searching Authority, or the Declaration, PCT/ISA/220, and the International Search Report, PCT/ISA/210, Feb. 16, 2023.
(Continued)

*Primary Examiner* — Carolyn R Edwards
*Assistant Examiner* — Friedrich Fahnert
(74) *Attorney, Agent, or Firm* — Kilpatrick, Townsend & Stockton, LLP

(57) ABSTRACT

A method for determining an environment in which a user is located is described. The method includes receiving a plurality of sets of audio data based on sounds emitted in a plurality of environments. Each of the plurality of environments has a different combination of objects. The method further includes receiving input data regarding the plurality of environments, and training an artificial intelligence (AI) model based on the plurality of sets of audio data and the input data. The method includes applying the AI model to audio data captured from an environment surrounding the first user to determine a type of the environment.

14 Claims, 14 Drawing Sheets

(52) U.S. Cl.
CPC ............. *G06N 20/00* (2019.01); *G06V 20/50* (2022.01); *A63F 2300/1081* (2013.01); *A63F 2300/538* (2013.01); *A63F 2300/6081* (2013.01)

(58) Field of Classification Search
CPC ............ A63F 2300/6081; A63F 13/424; A63F 13/65; G06F 3/165; G06F 3/011; G06N 20/00; G06V 20/50; G10L 25/51; G10L 21/0208
USPC ............................................................ 381/1
See application file for complete search history.

(56) References Cited

U.S. PATENT DOCUMENTS

| | | | |
|---|---|---|---|
| 2017/0287218 A1* | 10/2017 | Nuernberger | ....... G06F 3/04845 |
| 2019/0228589 A1* | 7/2019 | Dascola | ................ G06F 3/0304 |
| 2019/0236416 A1* | 8/2019 | Wang | ....................... G10L 17/22 |
| 2019/0392212 A1* | 12/2019 | Sawhney | ................... G06T 7/70 |
| 2020/0388068 A1* | 12/2020 | Yeung | ..................... G06N 20/00 |
| 2021/0058731 A1 | 2/2021 | Koike et al. | |
| 2022/0101623 A1 | 3/2022 | Walsh et al. | |
| 2022/0392478 A1* | 12/2022 | Hijazi | ................. G10L 21/0364 |
| 2023/0147573 A1* | 5/2023 | Chien | ................. G06V 40/168 705/7.34 |
| 2023/0158409 A1* | 5/2023 | Gardner | ................ A63F 13/352 463/6 |

OTHER PUBLICATIONS

Chen et al. "SoundSpaces 2.0: A Simulation Platform for Visual-Acoustic Learning", arxiv.org, Cornell University, Ithaca, NY, Jun. 16, 2022, XP091252433.

Chen et al. "SoundSpaces: Audio-visual Navigation in 3D Environments", arxiv.org, Cornell University, Ithaca, NY Aug. 20, 2020, XP081744383.

* cited by examiner (User Using AR to Play A Game At a Location)

User Account 1

Identify Objects Within an Environment & Type of Environment

1) Chair ☐
2) Desktop Table ☐
3) Window w/o Blinds ☐
4) Window w Blinds ☐
5) Open Can ☐
6) Closed Can ☐
7) Kids outside the environment ☐
8) Vehicle outside the environment ☐
9) Can is closer to mic than speaker ☐
10) Speaker is closer to mic than can ☐
11) Room in a House ☐

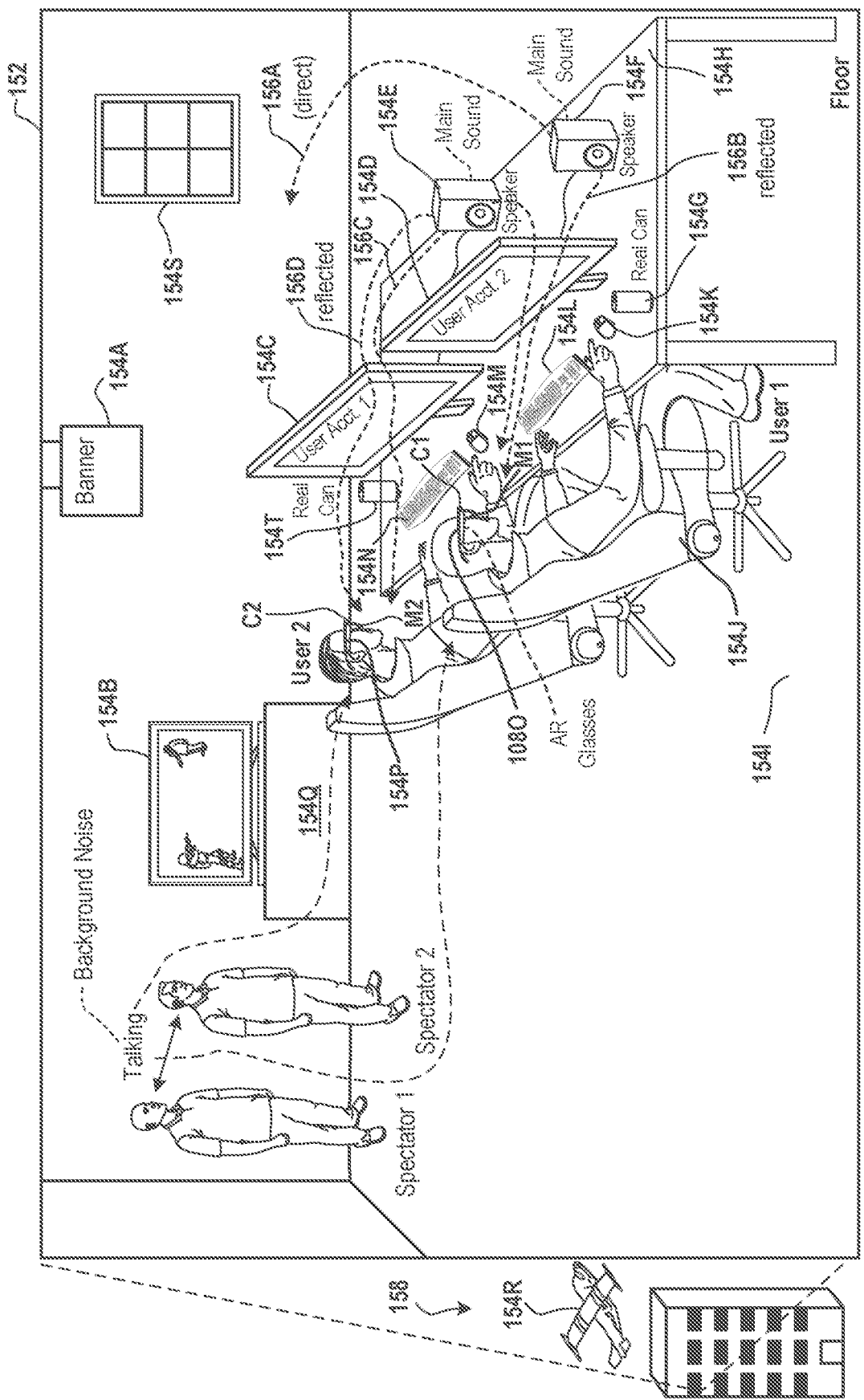
FIG. 1B (User Using AR to Play A Game At Another Location)

─ 400
States of Objects:

Flooring

Carpet
Tile
Concrete

Window Blinds

Open
Close

Container

Open
Close

FIG. 4A

─ 402
Types of Objects:

Vehicle (e.g., car, plane)

Monitor

Speaker (external)

Human

─ (e.g., Studio)
House or Building

Carpet or Bare Floor

Wall or Window

FIG. 4B

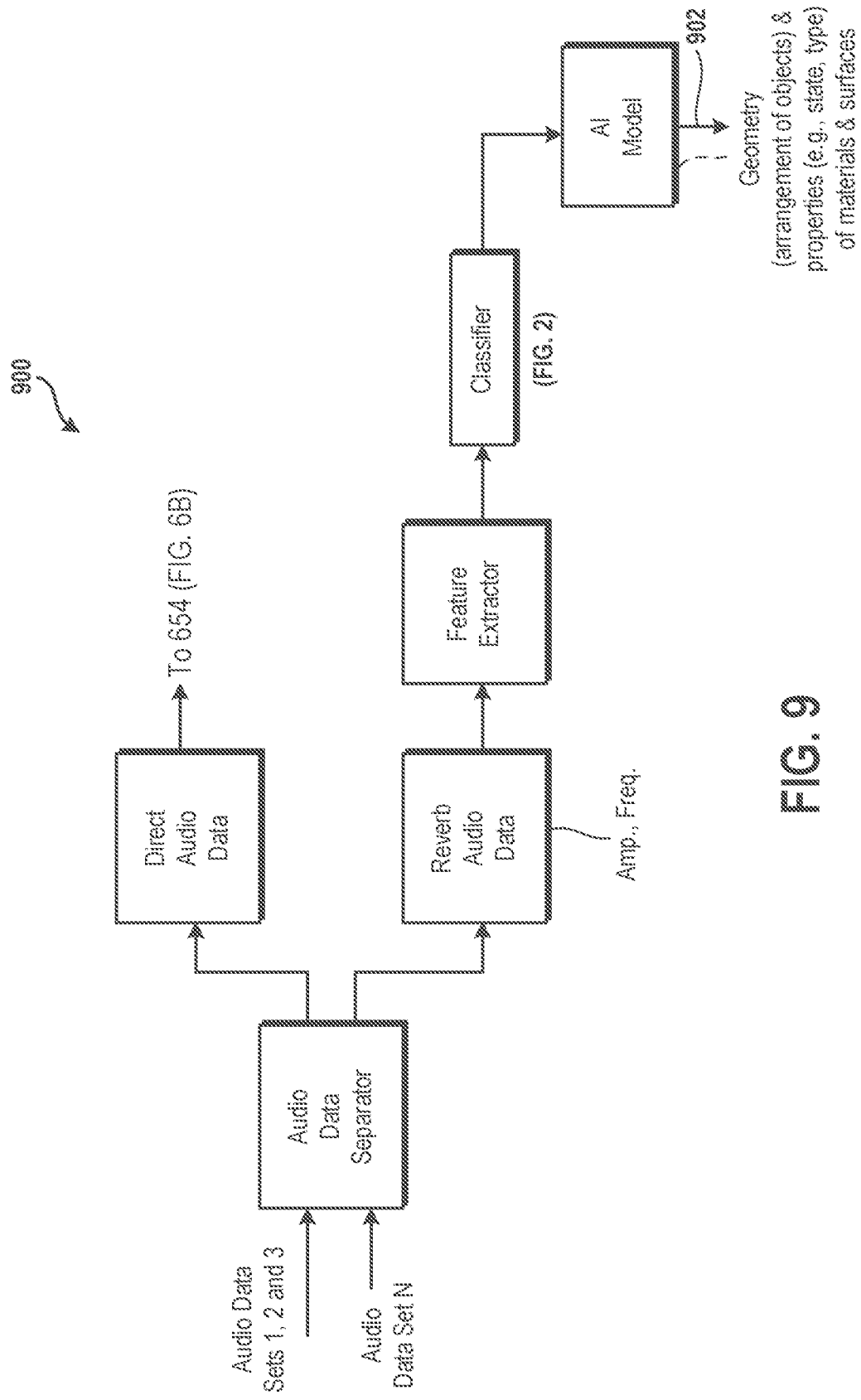

SYSTEMS AND METHODS FOR TRAINING A MODEL TO DETERMINE A TYPE OF ENVIRONMENT SURROUNDING A USER

FIELD

The present disclosure relates to systems and methods for training a model to determine a type of environment surrounding a user.

BACKGROUND

In a multi-player game, there are multiple game players. Each player wears a head-mounted display (HMD) to play the game or to view an environment of an application. During a play of the game or execution of the application, sometimes, each player cannot see an environment in front of the player.

It is in this context that embodiments of the invention arise.

SUMMARY

Embodiments of the present disclosure provide systems and methods for training a model to determine a type of environment surrounding a user.

In an embodiment, one or more microphones are used to detect acoustic characteristics of a current environment. An example of the current environment is a location, such as a room within a house or a building or an outdoor environment, where a user is located. Another example of the current environment is a location, such as a room within a building, at which the user is playing a video game and providing selections to generate inputs to the video game.

In one embodiment, an acoustic profile of an environment is generated in response to a user's request to generate the acoustic profile. The acoustic profile is generated by capturing sounds in the environment, such as a space or room, including reflections and rebounds of sound from different objects located in the environment. A configuration of the environment around the user or around a microphone or microphone array, is utilized to define the current environment.

In an embodiment, the environment includes sounds that are generated as background noise. The background noise is created by other people talking, music playing, extraneous sounds from outside, noises being made by mechanical objects in the environment or around the environment, and the like. By profiling a soundscape of the environment, it is possible to identify specific identifying characteristics using a machine learning system. For instance, training can occur by running an environment profiler application in a multitude of different environments. Over time, the learning process using the machine learning system identifies objects that are in the different environments, or objects that are around the different environments that create noise or sounds. In the profiling, the machine learning system also identifies acoustics of the different environments in which the sounds are being monitored. Once the training has been processed using the machine learning system to a sufficient level, a machine learning model trained based on sound profiles of the different environments is used to automatically identify things, objects, or sounds that are present in the current environment. These objects that are present in the current environment produce and reflect sounds, which are detected to create acoustics of the current environment. For instance, if the user is playing a game in front of one or more monitors, there is reflection of sounds coming off of the monitors during the gameplay. These types of reflections are processed using the machine learning system to identify unique characteristics to determine that the user is playing the game in front of another monitor. This type of characteristic identification can be used for detecting other objects in the current environment where the user is located.

In an embodiment, the microphone array can be mounted on glasses, augmented reality (AR) glasses, head-mounted display (HMD) devices, or on user peripheral devices, such as hand-held controllers.

In one embodiment, during the training, the user is requested to turn his/her head around in the different environments to capture different sounds if the microphone array is located on the glasses or the HMD. In other embodiments, a configuration of the different environments is done passively, where audio signals and acoustic nature of the objects in the different environments are tracked over time when the user moves around from one of the different environments to another one of the different environments.

In an embodiment, a profiling of the different environments for acoustic characteristics will provide for a type of acoustic vision of the current environment. For example, if the microphone array is located on the HMD or AR glasses or glasses, as the user moves and looks around the different environments, the machine learning system can almost instantaneously identify what is in front of the user based on acoustic reflections and bounce backs of signals from the current environment.

In an embodiment, when people move into the current environment, acoustic signals in front of the user change and based on a profile of the acoustic signals, it is possible to identify or see using acoustic vision what is likely in front of the user. In one embodiment, acoustic visions of the different environments can be blended with data received from cameras to identify or verify that an object is present based on the acoustic profile of the object in front of the user in the current environment.

In another embodiment, it is possible to create a virtual profile of a space. For example, if the user wants to appear as being located at a specific location, e.g. a concert, a park, a gaming event, a studio, etc., the acoustic profiles known by the machine learning system can be used to produce sounds. The sounds produced based on the acoustic profiles can be blended into sounds produced by an application program so that the user appears to be at the specific location instead of an actual location of the user. For example, if the user is publishing a YouTube™ video, a sound scape produced can be customized for the user based on a type of the current environment the user wants to project or virtually project to $3^{rd}$ parties watching the YouTube™ video. For instance, if the user wants to provide a commentary of a sporting event, the soundscape in the back of the commentary can be virtually generated to mimic the sporting event, taking into account acoustic profiles present or likely to be present in a sporting event.

In an embodiment, a method for mapping acoustic properties of materials, surfaces, and geometry of a space is described. The mapping is performed by extracting reverberation information, such as reflections and diffusion, of sounds detected by one or more microphones. Audio data that is captured by the one or more microphones based on the sounds is separated into a direct component and a reverb component. The direct component is then resynthesized with different reverb characteristics, effectively replacing or modifying an acoustic environment of a listener with some other acoustic profile. The other acoustic profile is used in conjunction with visual or geometric mapping of a space, from cameras, Simultaneous Localization And Mapping (SLAM), or Light Detection and Ranging (LiDAR), etc., to build a more complete audiovisual mapping. Also, the reverb component is used to inform characteristics about a geometry of a space and properties of materials and surfaces.

In one embodiment, a method for determining an environment in which a user is located is described. The method includes receiving a plurality of sets of audio data based on sounds emitted in a plurality of environments. Each of the plurality of environments has a different combination of objects. The method further includes receiving input data regarding the plurality of environments, and training an artificial intelligence (AI) model based on the plurality of sets of audio data and the input data. The method includes applying the AI model to audio data captured from an environment surrounding the first user to determine a type of the environment.

Some advantages of the herein described systems and methods include helping the user or a robot to learn objects within an environment without a need to obtain images of the objects. For example, the robot learns identities of the objects, arrangement of the objects, and states of the objects in the environment without obtaining the images of the objects. Once the robot learns about the objects, the robot can be programmed to move around the objects and can then be shipped to the environment for use in the environment.

Additional advantages of the herein described systems and methods include providing a layout of an environment to a blind person. Before the blind person visits the environment, the layout of the environment is determined based on sounds emitted by objects within the environment. As such, the blind person can be made aware of the layout.

Further advantages of the herein described systems and methods include providing identities of objects and arrangements of the objects in an environment in front of a user when the user is wearing an HMD. When the user wears the HMD, sometimes, such as in a virtual reality (VR) mode, the user cannot see the environment in front of the user. The system and methods described herein facilitate providing the identities of objects and arrangements of the objects to the user to prevent an accident between the user and the objects.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1A-2 is a diagram of an embodiment of a system, which includes an input controller, an eyeglass, and a server system.

FIG. 1A-3 is a diagram of an embodiment to illustrate a training session during which a user is requested to turn his/her head around to capture views of an environment.

FIG. 1A-4 is a diagram of an embodiment of a list of objects that is displayed by a graphical processing unit (GPU) to generate an acoustic profile of multiple objects.

FIG. 1B is a diagram of an embodiment of an environment in which multiple users are playing the game.

FIG. 2 is a diagram of an embodiment of a system to illustrate processing of input data sets and of audio data sets to train an artificial intelligence (AI) model.

FIG. 3 is a diagram of an embodiment of a system for illustrating multiple associations between audio data sets and environment systems.

FIG. 4A is a diagram of an embodiment of states of objects.

FIG. 4B is a diagram of an embodiment of types of objects.

FIG. 9 is a diagram of an embodiment of a system to illustrate a method for using direct audio data to create an effect of an environment system and using reverb audio data to determine arrangement of objects, types of materials of the objects, and types of surfaces of the objects in an environment system.

DETAILED DESCRIPTION

Systems and methods for training a model to determine a type of environment surrounding a user are described. It should be noted that various embodiments of the present disclosure are practiced without some or all of these specific details. In other instances, well known process operations have not been described in detail in order not to unnecessarily obscure various embodiments of the present disclosure.

Figures 1, 1A:
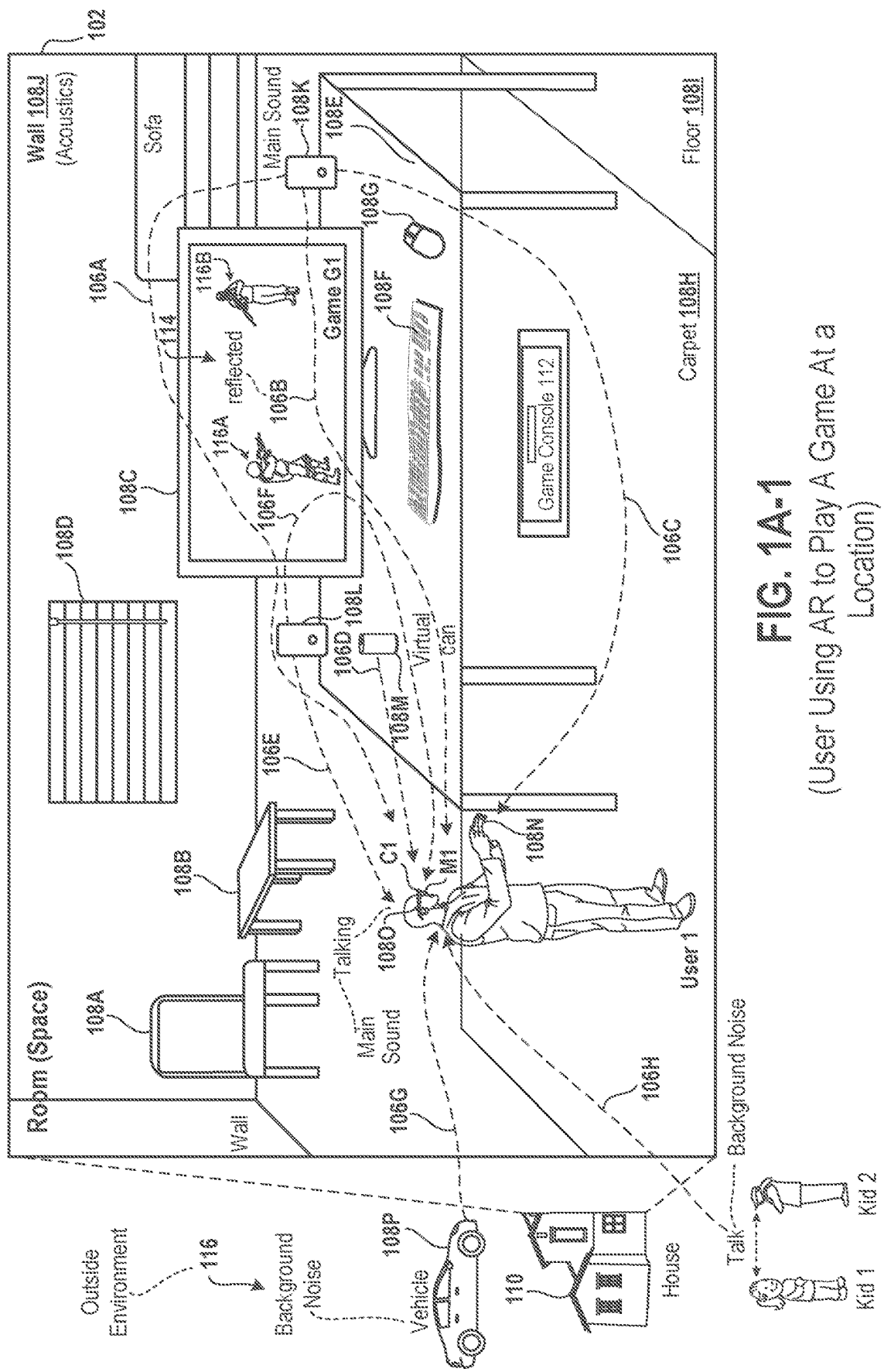
FIG. 1A-1 is a diagram of an embodiment of an environment in which a user is playing a game.

FIG. 1A-1 is a diagram of an embodiment of an environment 102 in which a user 1 is playing a game G1. An example of the environment 102 is a room within a house 110. The environment 102 includes multiple objects 108A, 108B, 108C, 108D, 108E, 108F, 108G, 108H, 108I, 108J, 108K, 108L, 108M, 108N, and 108O. The object 108A is a chair, the object 108B is a side table, the object 108C is a display device, such as a desktop monitor or a television monitor, and the object 108D is a window on a wall of the room of the house 110. The object 108D is the window with blinds, which are closed. The object 108E is a desktop table on which the display device is placed, the object 108F is a keyboard that is coupled to the display device, and the object 108G is a mouse that is coupled to the display device. For example, the keyboard is coupled to a central processing unit (CPU) of the display device and the mouse is also coupled to the CPU. As an example, the object 108E is made from plastic and has a smooth top surface.

The object 108H is a carpet that covers a floor of the room, and the object 108I is the floor of the room. The object 108J is the wall on which the window is located. The object 108K is a speaker that is coupled to the display device and the object 108L is another speaker that is coupled to the display device. For example, the speakers are coupled to the CPU of the display device. It should be noted that the object 108K is in front of the object 108C. Also, the object 108M is a soda can or a container, and the object 108N is a hand-held controller, which is coupled to a game console 112. The soda can is open in the environment 102. The game console 112 is coupled to the display device. For example, the game console 112 is coupled to the CPU or a graphical processing unit (GPU) of the display device. The object 108O is an eyeglass that is worn by the user 1. Examples of an eyeglass, as described herein, include a head-mounted display (HMD), a prescription glass, and an augmented reality (AR) eyeglass.

It should be noted that an object 108P, which is a vehicle, is located outside the house 110 and passes by the house 110 while the user 1 is playing the game G1. It should further be noted that a kid 1 and a kid 2 are playing in another room inside the house 110 and are talking to each other while the user 1 is playing the game G1. Each kid 1 and 2 is an example of an object.

The eyeglass includes a camera C1 and a microphone M1, which converts sounds into electrical energy. Examples of the camera C1 include a depth camera, a video camera, and a digital camera.

The user 1 accesses the game G1 from a game cloud, such as a server system, via a computer network, and plays the game G1, which has a virtual scene 114 represented on the display device. For example, the user 1 selects one or more buttons on the hand-held controller to provide authentication information, such as a user name and a password. The hand-held controller sends the authentication information to the game console 112, which forwards the authentication information via the computer network to the game cloud. An authentication server of the game cloud determines whether the authentication information is authentic and upon determining so, provides access to a user account 1 and a game program that executes on the game cloud. When the game program is executed by one or more processors of the game cloud, image frames of the game G1 are generated and encoded to output encoded image frames. The encoded image frames are sent to the game console 112. The game console 112 decodes the encoded image frames and provides the image frames to the display device to display the virtual scene 114 of the game G1 to further allow the user 1 to play the game G1.

During the play of the game G1, sounds of the game G1 are output from the speakers that are coupled to the display device. For example, when a virtual object 116A within the virtual scene 114 is shooting at another virtual object 116B, a sound of the shooting is output. As an example, the virtual object 116A is controlled by the user 1 via the hand-held controller. In addition, during the play of the game G1, the vehicle makes sound, such as blowing a horn or engine noise or tire screech. Also, during the play of the game G1, the kids 1 and 2 make sound, such as by talking to each other or arguing with each other or playing with each other. Also, during the play of the game G1, the user 1 opens the can and the opening of the can makes a sound. Moreover, during the play of the game G1, the user 1 utters words, which is an example of sound.

The microphone M1 captures audio data, such as audio frames, generated from sounds associated with, such as emitted from or reflected from, one or more of the objects 108A through 108O located within the environment 102. For example, the microphone M1 captures audio data generated based on sound emitted from the object 108K and received via a path 106A from the object 108K. In the example, the path 106A of sound is a direct path from the speaker to the microphone M1 and is not incident on any other surface between the speaker and the microphone M1. As another example, the microphone M1 captures audio data generated based on sound emitted from the object 108K and received via a path 106B from the object 108K. In the example, the path 106B of sound is an indirect path from the object 108K to the microphone M1. To illustrate, the sound emitted from the object 108K is incident on one or more other objects within the environment 102, such as the display device, and is reflected from the one or more other objects towards the microphone M1. As still another example, the microphone M1 captures audio data generated based on sound emitted from the object 108K and received via a path 106D from the object 108K. In the example, the path 106D of sound is an indirect path from the speaker to the microphone M1. To illustrate, the sound emitted from the object 108K is incident on one or more other objects within the environment 102, such as the carpet, and is reflected from the one or more other objects towards the microphone M1.

As another example, the microphone M1 captures audio data generated based on sound emitted from the object 108L and received via a path 106D from the object 108L. In the example, the path 106D of sound is an indirect path from the speaker to the microphone M1. To illustrate, the sound emitted from the object 108L is incident on one or more other objects within the environment 102, such as the can, and is reflected from the one or more other objects towards the microphone M1. As yet another example, the microphone M1 captures audio data generated based on sound emitted from the object 108L and received via a path 106E from the object 108L. In the example, the path 106E of sound is a direct path from the speaker to the microphone M1 and is not incident on any other surface between the speaker and the microphone M1. As still another example, the microphone M1 captures audio data generated based on sound emitted from the object 108L and received via a path 106F from the object 108L. In the example, the path 106F of sound is an indirect path from the speaker to the microphone M1. To illustrate, the sound emitted from the object 108L is incident on one or more other objects within the environment 102, such as the desktop table, and is reflected from the one or more other objects towards the microphone M1.

The microphone M1 of the eyeglass also captures audio data generated based on sounds, such as background noise, that are emitted from one or more of the object 108P, the kid 1, and the kid 2 located outside the environment 102 but in proximity to the environment 102. The environment outside the environment 102 is sometimes referred to herein as an outside environment 116. As an example, the microphone M1 captures audio data generated based on sound emitted from the object 108P and received via a path 106G from the object 108P. In the example, the path 106G extends through a wall or a door or a doorway of the environment 102. In the example, when the door of the environment 102 is open, the sound extends through the doorway and when the door is closed, the sound extends through the door. As another example, the microphone M1 captures audio data generated based on sound uttered by the kid 1 or the kid 2 or both the kids 1 and 2 and received via a path 106H from the kid 1 or the kid 2 or both the kids 1 and 2. In the example, the path 106H extends through a wall or a door or a doorway of the environment 102.

It should be noted that as an example, the outside environment 116, such as the room next to the environment 102, or a street outside the house 110, is proximate to the environment 102 when sounds emitted from objects within the outside environment 116 can reach the microphone M1 for being detected by the microphone M1. For example, sounds emitted from the outside environment 116 pass through a wall of the environment 102 to be detected by the microphone M1.

The microphone M1 captures audio data, such as audio frames, generated from the sounds associated with, such as emitted from or reflected, the objects 108A through 108O within the environment 102 and the background noise emitted from one or more of the object 108P, the kid 1, and the kid 2 within the outside environment 116. Encoded audio frames generated based on the audio frames captured by the microphone M1 are provided via the computer network to the one or more processors of the game cloud for processing and for training an artificial intelligence (AI) model.

In an embodiment, sound, as used herein, includes sound waves.

In one embodiment, the terms object and item are used herein interchangeably.

In one embodiment, the display device includes a memory device. The CPU of the display device is coupled to the memory device.

In an embodiment, sound emitted by the speakers is reflected from the user 1 and is captured by the microphone M1. In the embodiment, the user 1 is an example of an object.

In an embodiment, instead of being displayed on the display device, the virtual scene 114 is displayed on a display screen of the eyeglass worn by the user 1.

In an embodiment, the user 1 accesses the game G1 from the game cloud without a need to use the game console 112. For example, encoded image frames of the game G1 are sent from the game cloud via the computer network to the eyeglass or the display device placed on the desktop table without sending the encoded image frames to the game console 112 for video decoding. The encoded image frames are decoded by the eyeglass or the display device. In the embodiment, the encoded audio frames that are generated based on the audio frames output from the microphone M1 are sent from the eyeglass via the computer network to the game cloud without using the game console 112.

In one embodiment, the virtual scene 114 includes other virtual objects and based on movements of the other virtual objects, sound is output from the speakers placed on the desktop table.

In an embodiment, instead or in addition to the microphone M1, there are one or more additional microphones, such as a stand-alone microphone, for capturing the sounds emitted from objects within the environment 102 and the sounds emitted from objects located within the outside environment 116. For example, the display device situated on the desktop table includes an additional microphone. As another example, the environment 102 includes one or more stand-alone microphones. As yet another example, the hand-held controller includes an additional microphone.

In one embodiment, the user 1 is not playing the game G1. In the embodiment, instead of the game program, the one or more processors of the game cloud execute another application program, such as a video conferencing application program or a multimedia program. For example, when the video conferencing application is executed, video image frames captured from an additional environment are transferred via the computer network to the display device or the game console or the eyeglass worn by the user 1.

In an embodiment, instead of the environment 102, an outdoor environment such as a concert, a lake, or a park, is used.

In one embodiment, instead of or in addition to the sound output from the object 108K or 108L, sound is output from a speaker integrated within the object 108C and is detected by the microphone M1 to capture audio data.

Figures 1, 1A, 2:
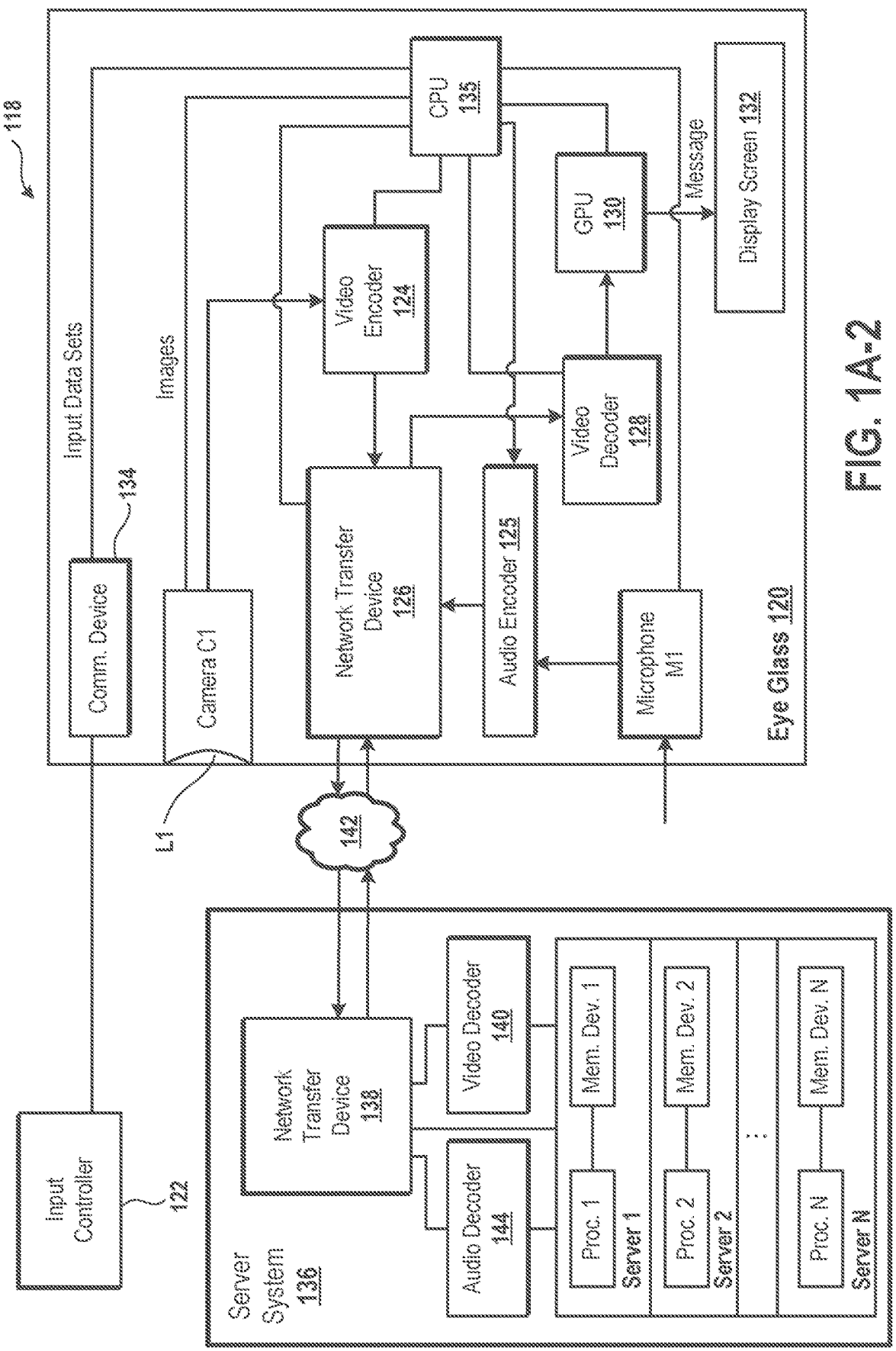

FIG. 1A-2 is a diagram of an embodiment of a system 118, which includes an input controller 122, an eyeglass 120, and a server system 136. The server system 136 is an example of the game cloud. The eyeglass 120 is example of the object 108O (FIG. 1A-1). The hand-held controller is an example of the input controller 112. The eyeglass 120 includes the camera C1, a video encoder 124, an audio encoder 125, a network transfer device 126, a video decoder 128, a GPU 130, a display screen 132, and a CPU 135. An example of the video encoder 124 is a circuit that applies a video conversion protocol, such as, a video encoding protocol, to image frames to output encoded data, such as encoded image frames, and provides the encoded data to the network transfer device 126. To illustrate, the video encoder 124 generates I, P, or B frames, which are examples of the encoded image frames. Examples of the video encoding protocol, such as a video compression protocol, include H.262, H.263, and H.264. An example of the audio encoder 125 is a circuit that compresses audio frames into encoded audio frames. To illustrate, an audio encoder applies an audio encoding protocol, such as lossless compression or lossy compression, to encode audio frames into encoded audio frames. An example of the lossy compression includes modified discrete cosine transform (MDCT) to convert time domain sampled waveforms into a frequency domain. Another example of the lossy compression is linear predictive coding (LPC) that analyzes the audio data generated based on speech sounds.

An example of a network transfer device, as used herein, is a network interface controller, such as a network interface card (NIC). Another example of a network transfer device is a wireless access card (WAC). An example of a video decoder, as used herein, is a circuit that performs H.262, H.263, or H.264 decoding or another type of video decompression to output decoded data, such as image frames. An example of the display screen 132 is a liquid crystal display (LCD) screen or a light emitting diode (LED) display screen. An example of a communication device of a device is a circuit that applies a communication protocol, such as a wired communication protocol or a wireless communication protocol, to communicate with another device or system. Examples of the CPU 135 include a processor, a microprocessor, a microcontroller, an application specific integrated circuit (ASIC), and a programmable logic device (PLD). The camera C1 includes a lens L1 that faces an environment, such as the environment 102 (FIG. 1A-1). For example, the camera C1 is an external facing camera.

The CPU 135 is coupled to other components of the eyeglass 120. For example, the CPU 135 is coupled to the communication device 134, the camera C1, the network transfer device 126, the video encoder 124, the GPU 130, the video decoder 128, the audio encoder 125, and the microphone M1 to control the other components of the eyeglass 120. Also, the camera C1 is coupled to the video encoder 124, which is coupled to the network transfer device 126. The network transfer device 126 is coupled to a computer network 142, the audio encoder 125, and to the video decoder 128. The audio encoder 125 is coupled to the microphone M1. The video decoder 128 is coupled to the CPU 130, which is coupled to the display screen 132.

Examples of the computer network 142 include a local area network (LAN), a wide area network (WAN), and a combination thereof. To illustrate, the computer network 142 is the Internet or an Intranet or a combination thereof.

The server system 136 includes a network transfer device 138, a video decoder 140, an audio decoder 144, and one or more servers 1 through N, where N is an integer greater than zero. An example of an audio decoder is a circuit that decompresses encoded audio frames into audio frames. To illustrate, an audio decoder applies an audio decoding protocol, such as an audio decompression protocol, to decode encoded audio frames into audio frames. Each server 1 through N includes a processor and a memory device. For example, the server 1 includes a processor 1 and a memory device 1, the server 2 includes a processor 2 and a memory device 2, and the server N includes a processor N and a memory device N. The network transfer device 126 is coupled to the computer network 142 and is also coupled to the video decoder 140, which is coupled to the one or more servers 1 through N. The network transfer device 126 is coupled to the audio decoder 144, which is coupled to the one or more servers 1 through N. Operation of the system 118 is described with reference to FIG. 1A-3.

In an embodiment, when the eyeglass 120 is the AR eyeglass, the input controller 122 is separate from the hand-held controller used to play the game G1.

In one embodiment, the eyeglass 120 includes multiple display screens instead of the display screen 132. Each of the display screens has a similar structure and function as that of the display screen 132.

In an embodiment, the eyeglass 120 includes one or more additional lenses in addition to the lens L1 to capture images of an environment, such as the environment 102.

In one embodiment, the eyeglass 120 includes one or more memory devices, such as a random access memory (RAM) or a read-only memory (ROM). The one or more memory devices are coupled to the CPU 135 or the GPU 130 or both the CPU 135 and the GPU 130. For example, the CPU 135 includes a memory controller for accessing data from the one or more memory devices and for writing data to the one or more memory devices.

In an embodiment, the memory controller is a device separate from the CPU 135.

FIG. 1A-3 is a diagram of an embodiment to illustrate a training session during which the user 1 is requested to turn his/her head around to capture views of an environment, such as the environment 102 (FIG. 1A-1). When the authentication information received from the user 1 is authenticated, the user 1 is provided access to the user account 1 by the authentication server. The user 1 can then access the training session or the game program or the other application program. During the training session, before or during execution of the game program or the other application program, a training program is executed by the one or more processors 1 through N of the game cloud to generate a message 121. For example, before or during execution of the game program, the server system 136 (FIG. 1A-2) executes the training program to generate image frames having the message 121, encodes the image frames to output encoded image frames having the message 121, applies a network transfer protocol to the encoded image frames to generate data packets having the message 121, and sends the data packets via the computer network 142 to the eyeglass 120 (FIG. 1A-2). In the example, the network transfer device 126 (FIG. 1A-2) of the eyeglass 120 applies the network transfer protocol to obtain the encoded image frames from the data packets and provides the encoded image frames to the video decoder 128 (FIG. 1A-2) of the eyeglass 120. In the example, the video decoder 128 applies the video conversion protocol, such as a video decoding protocol, to decode the encoded images frames to output the image frames having the message 121 and provides the image frames to the GPU 130 (FIG. 1A-2). In the example, the GPU 130 applies a rendering program to display the message 121 on the display screen 132 (FIG. 1A-2). In the example, the training program is computer software that is stored in one or more memory devices 1 through N of the server system 136. An example of the network transfer protocol includes a Transmission Control Protocol (TCP) over Internet Protocol (IP).

Upon viewing the message 121, the user 1 turns his/her head around to capture a view, such as a 360 degree view, of the environment 102. For example, as the user 1 turns his/her head around within the environment 102 to view the environment 102, the camera C1 of the eyeglass 120 captures images of the objects 108A through 108O within the environment 102. With reference to FIG. 1A-1, the camera C1 sends the images of the objects 108A through 108OP to the video encoder 124 of the eyeglass 120. The video encoder 124 applies the video encoding protocol to encode the images received from the camera C1 to output encoded image frames, and sends the encoded image frames to the network transfer device 126. The network transfer device 126 applies the network transfer protocol to generate data packets from the encoded image frames and sends the data packets via the computer network 142 to the network transfer device 138 of the server system 136.

The network transfer device 138 of the server system 136 obtains the data packets from the eyeglass 120 via the computer network 142 and applies the network transfer protocol to the data packets to extract the encoded image frames of the objects 108A through 108O. The network transfer device 138 sends the encoded image frames to the video decoder 140 of the server system 136. The video decoder 140 applies the video decoding protocol to the encoded image frames to output image frames and provides the image frames to the one or more processors 1 through N of the game cloud.

Also, the microphone M1 generates the audio frames based on sounds emitted from the objects, such as the user 1 and the speakers, within the environment 102 (FIG. 1A-1) and the background noise emitted from the object 108P, and the kids 1 and 2 within the outside environment 116 (FIG. 1A-1). The audio frames are sent from the microphone M1 to the audio encoder 125 of the eyeglass 120. The audio encoder 125 applies the audio encoding protocol to output encoded audio frames. The encoded audio frames are provided from the audio encoder 125 to the network transfer device 126. The network transfer device 126 applies the network transfer protocol to the encoded audio frames to generate data packets and sends the data packets via the computer network 142 to the server system 136.

The network transfer device 138 of the server system 136 receives the data packets from the eyeglass 120 and applies the network transfer protocol to the data packets to output the encoded audio frames. The network transfer device 128 provides the encoded audio frames to the audio decoder 144. The audio decoder 144 applies the audio decoding protocol to the encoded audio frames to output the audio frames, and provides the audio frames to the one or more processors 1 through N for storage within the one or more memory devices 1 through N.

It should be noted that although FIG. 1A-3 is described with reference to the game program, FIG. 1A-3 is equally applicable to the other application program, such as the video conferencing application program.

In an embodiment, although FIG. 1A-3 is described with reference to the user 1, the environment 120, and an eyeglass worn by the user 1, FIGS. 1A-3 is equally applicable to another user, another environment, and an eyeglass worn by the other user.

FIG. 1A-4 is a diagram of an embodiment of a list 150 of objects that is displayed by the GPU 130 (FIG. 1A-2) to generate an acoustic profile of the objects 108A through 108P (FIG. 1A-1). The list 150 includes states of objects in an environment system. For example, the list 150 includes a first entry that there are no blinds to cover the window of the environment 102 and a second entry that there are blinds to cover the window. As another example, the list 150 includes a third entry that the can is open and a fourth entry that the can is closed. As yet another example, the list 150 includes an arrangement of objects within the environment 102. To illustrate, the list 150 includes a fourth entry indicating that the can is closer to the microphone M1 compared to the object 108K or 108L, and a fifth entry indicating that the object 108L is closer to the microphone M1 compared to the object 108K.

Instead of or in addition to providing the message 121, during the training session, before or during execution of the game program, a training program is executed by the one or more processors 1 through N (FIG. 1A-2) to generate the list 150. For example, before or during execution of the game program, the server system 136 executes the training program to generate image frames having the list 150, encodes the image frames to output encoded image frames having the list 150, applies the network transfer protocol to the encoded image frames to generate data packets having the list 150, and sends the data packets via the computer network to the eyeglass 120 (FIG. 1A-2). In the example, the network transfer device 126 (FIG. 1A-2) of the eyeglass 120 applies the network transfer protocol to obtain the encoded image frames from the data packets and provides the encoded image frames to the video decoder 128 (FIG. 1A-2) of the eyeglass 120. In the example, the video decoder 128 applies the video conversion protocol, such as the video decoding protocol, to decode the encoded images frames to output the image frames having the list 150 and provides the image frames to the GPU 130 (FIG. 1A-2). In the example, the GPU 130 applies the rendering program to display the list 150 on the display screen 132 (FIG. 1A-2). In the example, the training program is computer software that is stored in one or more of the memory devices 1 through N of the server system 136.

Upon viewing the list 150, the user 1 uses the input controller 122 to select one or more checkboxes next to one or more items within the list 150 to identify the objects O108A through O108P, and the kids 1 and 2. A communication device of the input controller 122 applies the communication protocol to the selection of the one or more checkboxes within the list 150 to generate one or more transfer packets and sends the transfer packets to the communication device 134 of the eyeglass 120. The communication device 134 applies the communication protocol to the transfer packets to obtain the list 150 from the transfer packets, and sends the selection of the one or more checkboxes within the list 150 to the CPU 135 of the eyeglass 120. The CPU 135 sends the selection of the one or more checkboxes within the list 150 to the network transfer device 126 of the eyeglass 120. The network transfer device 126 applies the network transfer protocol to the selection of the one or more checkboxes within the list 150 to generate data packets. The network transfer device 126 sends the data packets via the computer network 142 to the one or more processors 1 through N of the server system 136. The network transfer device 138 receives the data packets from the computer network 142 and applies the network transfer protocol to the data packets to obtain the selection of the one or more checkboxes within the list 150, and provides the selection to the one or more processors 1 through N of the server system 136.

In one embodiment, instead of the list 150, a list of blank lines is generated by the one or more processors 1 through N and sent via the computer network 142 (FIG. 1A-3) to the eyeglass 120 (FIG. 1A-3). The user 1 uses the input controller 122 to fill in the blank lines to provide a list of the objects 108A through 108P and the kids 1 and 2.

FIG. 1B is a diagram of an embodiment of another environment 152 in which the user 1 and a user 2 are playing the game G1. The environment 152 is a room in a tall building. For example, the room is on a topmost floor of the building. The environment 152 includes spectators 1 and 2. Each spectator 1 and 2 is an example of an object of the environment 152. The environment 152 further includes objects 154A, 154B, 154C, 154D, 154E, 154F, 154G, 154H, 154I, 154J, 154K, 154L, 154M, 154N, 108O, 154P, and 154Q. The object 154A is a banner that hangs from a ceiling of the environment 152. The object 154B is a display device. An example of a display device is a desktop monitor or a television. The object 154C is a display device and the object 154D is another display device. Each object 154C and 154D includes a CPU and a memory device, located within the object. The user 1 plays the game G1, which has a virtual scene displayed on the desktop monitor 154D. The user 2 plays the game G1, which has a virtual scene displayed on the desktop monitor 154C.

The object 154E is a speaker that is coupled to the object 154C and the object 154F is a speaker that is coupled to the object 154D. The object 154E is behind the object 154C and the object 154F is behind the object 154D. The object 154G is a can or a container and the object 154H is a table on which the objects 154C and 154D are placed. As an example, the object 154H has a top surface made from marble and has an uneven surface. The can is closed in the environment 152. Also, the object 154I is a floor of the environment 152. The floor is not carpeted and is bare. For example, the floor has a tiled surface. The object 154J is a chair on which the user 1 sits and the object 154K is a mouse that is coupled to the object 154D and the object 154L is a keyboard that is coupled to the object 154D. The object 154M is a mouse that is coupled to the object 154C and the object 154N is a keyboard that is coupled to the object 154C.

The object 154P is an eyeglass that is worn by the user 2. The object 154P includes a microphone M2 and a camera C2. The object 154Q is a cabinet stand on which the object 154B rests. Also, an object 154R, which is an airplane, is located outside the environment 152 and flies above the building while the users 1 and 2 are playing the game G1.

The environment 152 further includes an object 154S and another objet 154T. The object 154S is a window without blinds and the object 154T is a can or a container.

It should be noted that the user 1 moves from one location, such as the environment 102 (FIG. 1A-1) to another location, such as the environment 152. The user 1 accesses the game G1 from the game cloud via the computer network 142 (FIG. 1A-2) and the user account 1, and plays the game G1, which has a virtual scene represented on a display screen of the object 154D. For example, the user 1 selects one or more buttons on one or more of the objects 154L and 154K to provide authentication information, such as a user name and a password. The objects 154L and 154K send the authentication information to the object 154D, which forwards the authentication information via the computer network 142 to the game cloud. The authentication server of the game cloud determines whether the authentication information is authentic and upon determining so, provides access to the user account 1 and game program that executes on the game cloud. When the game program is executed by one or more of the processors 1 through N of the game cloud, image frames of the game G1 are generated and encoded to output encoded image frames. The encoded image frames are sent to the object 154D. The object 154D decodes the encoded image frames and provides the image frames to the display screen of the object 154D of the virtual scene displayed on the object 154D to allow the user 1 to play the game G1.

During the play of the game G1, sounds of the game G1 are output from the object 154F. For example, when a virtual object within the virtual scene displayed on the object 154D jumps and lands on a virtual ground in the virtual scene, a sound of landing is output via the object 154F. As an example, the virtual object within the virtual scene displayed on the object 154D is controlled by the user 1 via the objects 154L and 154K. In addition, during the play of the game G1, the airplane flying over the environment 152 makes a sound, such as a sonic boom. Also, during the play of the game G1, the spectators 1 and 2 make sound, such as by talking to each other or arguing with each other or playing with each other. Also, during the play of the game G1, the user 1 opens the container placed on the object 154H and the opening of the container makes a sound. Moreover, during the play of the game G1, the user 1 utters words, which is an example of sound.

Both the users 1 and 2 are in the same environment 152 and therefore, are at the same location. Similarly, the user 2 accesses the game G1 from the game cloud via the computer network 142 and a user account 2, and plays the game G1, which has a virtual scene represented on a display screen of the object 154C. As an example, the user 2 selects one or more buttons on the objects 154N and 154M to provide authentication information, such as a user name and a password. The objects 154N and 154M send the authentication information to the object 154C, which forwards the authentication information via the computer network 142 to the game cloud. The authentication server of the game cloud determines whether the authentication information is authentic and upon determining so, provides access to the user account 2 and the game program that executes on the game cloud. When the game program is executed by one or more of the processors 1 through N of the game cloud, image frames of the game G1 are generated and encoded to output encoded image frames. The encoded image frames are sent to the object 154C. The object 154C decodes the encoded image frames and provides the image frames to the display screen of the object 154C of the virtual scene displayed on the object 154C to allow the user 2 to play the game G1.

During the play of the game G1, sounds of the game G1 are output from the object 154E. For example, when a virtual object within the virtual scene displayed on the object 154C is flying in the virtual scene, a sound of flying is output via the object 154E. As an example, the virtual object within the virtual scene displayed on the object 154C is controlled by the user 2 via the objects 154N and 154M. Also, during the play of the game G1, the user 2 opens the object 154T placed on the object 154H and the opening of the object 154T makes a sound. Moreover, during the play of the game G1, the user 2 utters words, which is an example of sound.

Each microphone M1 and M2 captures audio data, such as audio frames, generated from sounds that are associated with, such as emitted from or reflected from, one or more of the objects located within the environment 152. For example, the microphones M1 and M2 capture audio data generated based on sound emitted from the object 154F and received via a path 156A from the object 154F. In the example, the path 156A of sound is a direct path from the object 154F to the microphones M1 and M2 and is not incident on any other surface between the object 154F and the microphones M1 and M2. As another example, the microphones M1 and M2 capture sound emitted from the object 154F and received via a path 156B from the object 154F. In the example, the path 154F of sound is an indirect path from the object 154F to the microphones M1 and M2. To illustrate, the sound emitted from the object 154F is incident on one or more other objects within the environment 152, such as the object 154D, and is reflected from the one or more other objects towards the microphones M1 and M2.

As yet another example, each microphone M1 and M2 captures audio data generated based on sound emitted from the object 154E and received via a path 156C from the object 154E. In the example, the path 156C of sound is a direct path from the object 154E to the microphones M1 and M2 and is not incident on any other surface between the object 154E and the microphones M1 and M2. As still another example, the microphones M1 and M2 capture sound emitted from the object 154E and received via a path 156D from the object 154E. In the example, the path 156D of sound is an indirect path from the object 154E to the microphones M1 and M2. To illustrate, the sound emitted from the object 154E is incident on one or more other objects within the environment 152, such as the object 154C, and is reflected from the one or more other objects towards the microphones M1 and M2.

Each microphone M1 and M2 also captures audio data generated based on sounds, such as background noise, that is emitted from the object 154R located outside the environment 152. The environment outside the environment 152 is sometimes referred to herein as an outside environment 158. As an example, the microphones M1 and M2 capture sounds emitted from the object 154R and received via the ceiling of the environment 152.

The microphones M1 and M2 capture the sounds associated with, such as emitted from or reflected from, from one or more of the objects 154A through 154N, 108O, 154P, 154Q, 154S, 154T, and the spectators 1 and 2 within the environment 152 and the background noise emitted from the object 154R within the outside environment 158 to generate audio frames, such as audio data. Encoded audio frames generated based on the audio frames are provided via the computer network 142 to the one or more of the processors 1 through N of the game cloud for processing and training of the AI model.

In one embodiment, the user 1 plays a different game than the game G1 and the user 2 plays a different game than the game G1.

In an embodiment, the outside environment 158 includes any other number, such as two or three, of objects.

In one embodiment, instead of or in addition to the sound output from the object 154E, sound is output from the object 154C and is detected by the microphones M1 or M2 or a combination thereof to capture audio data.

In an embodiment, instead of or in addition to the sound output from the object 154F, sound is output from the object 154D and is detected by the microphones M1 or M2 or a combination thereof to capture audio data.

In an embodiment, instead or in addition to the microphone M2, there are one or more additional microphones, such as a stand-alone microphone, for capturing the sounds emitted from objects within the environment 152 and the sounds emitted from objects located within the outside environment 158. For example, a display device situated on the table within the environment 152 includes an additional microphone.

In an embodiment, the virtual scene displayed on the object 154D, is instead displayed on the display screen of the eyeglass worn by the user 1. Similarly, the virtual scene displayed on the object 154C, is instead displayed on the display screen of the eyeglass worn by the user 2.

FIG. 2 is a diagram of an embodiment of a system 200 to illustrate processing of input data sets 1, 2, and 3 and of audio data sets 1, 2, and 3. The system 200 includes a client device 1, a client device 2, and a client device 3. The system 200 further includes a processor system 202. Examples of the client device 1 operated by the user 1 include the eyeglass that is worn by the user 1, the object 108C (FIG. 1A-1), the object 108N, the game console 112 (FIG. 1A-1), the object 108L (FIG. 1A-1), the object 108K (FIG. 1A-1), the object 154D (FIG. 1B), the object 154L, the object 154K, the object 154F, and a combination of two or more thereof. Examples of the client device 2 operated by the user 2 include the eyeglass worn by the user 2, the object 154C (FIG. 1B), the object 154M, the object 154N, the objet 154E, a game console, a hand-held controller, and a combination of two or more thereof. It should be noted that the eyeglass 120 (FIG. 1A-2) is an example of the eyeglass worn by the user 2 except that the camera C1 is replaced with the camera C2 and the microphone M1 is replaced with the microphone M2. Examples of the client device 3 are provided below with reference to FIG. 5A. The client device 3 is operated by a user 3.

The processor system 202 is coupled to the client devices 1, 2, and 3. For example, the processor system 202 is coupled to the client device 1-3 via the computer network 142 (FIG. 1B). To illustrate, the processor system 202 includes the one or more processors 1 through N of the server system 136 (FIG. 1A-2) that is coupled to the client devices 1-3 via the computer network 142.

Examples of the audio data set 1 include the audio data that is captured by the microphone M1 based on sounds associated with the environment 102 (FIG. 1A-1) and the background noise received from the outside environment 116 (FIG. 1A-1). Examples of the audio data set 2 include the audio data that is captured by the microphone M1 based on sounds associated with the environment 152 (FIG. 1B) and the background noise received from the outside environment 158 (FIG. 1B). Examples of the audio data set 3 include the audio data that is captured by the microphone M2 based on sounds associated with the environment 152 and the background noise received from the outside environment 158.

Examples of the input data set 1 include the images of one or more of the objects of the environment 102 (FIG. 1A-1) captured by the camera C1, the identification of the objects of the environment 102, and the identification of the objects in the outside environment 116 (FIG. 1A-1). To illustrate, an example the identification of the objects of the environment 102 and the objects in the outside environment 116 is received within the list 150 (FIG. 1A-4).

Examples of the input data set 2 include the images of one or more of the objects of the environment 152 (FIG. 1B) captured by the camera C1, an identification of the objects of the environment 152 received via the user account 1, and an identification of the objects in the outside environment 158 (FIG. 1B) received via the user account 1. To illustrate, the identification of the objects of the environment 152 and the objects in the outside environment 158 is received in a form of a list via the user account 1 from the user 1 in the same manner in which the identification of the objects of the environment 102 and the objects in the outside environment 116 is received via the list 150. In the illustration, the user 1 selects one or more objects within the list to provide the identification of the objects of the environment 152 and the objects in the outside environment 158. The list is generated in the same manner in which the list 150 is generated and is displayed on the object 154D (FIG. 1B) operated by the user 1.

Examples of the input data set 3 include the images of one or more of the objects of the environment 152 (FIG. 1B) captured by the camera C2, an identification of the objects of the environment 152 received via the user account 2, and an identification of the objects within the outside environment 158 (FIG. 1B) received via the user account 2. To illustrate, the identification of the objects of the environment 152 and the objects in the outside environment 158 is received in a form of a list via the user account 2 from the user 2 in the same manner in which the identification of the objects of the environment 102 and the objects in the outside environment 116 (FIG. 1A-1) is received via the list 150. In the illustration, the user 2 selects one or more objects within the list to provide the identification of the objects of the environment 152 and the objects in the outside environment 158. The list is generated in the same manner in which the list 150 is generated and is displayed on the object 154C (FIG. 1B) operated by the user 2.

The processor system 202 includes a game engine and an inferred training engine. An example of an engine includes hardware, such as one or more controllers. In the example, each controller includes one or more processors, such as the processors 1 through N or one or more processors of the game console 112 (FIG. 1A-1) or a combination thereof. As another example, an engine is software, such as a computer software program. To illustrate, the game engine is the game program. Another example of an engine is a combination of hardware and software.

The inferred training engine includes an AI processor and a memory device 204, which is an example of one of the memory devices 1 through N. The AI processor is coupled to the memory device 204 and is an example of one of the processors 1 through N. Within the memory device 204, the input data sets 1 through 3 and the audio data sets 1 through 3 are stored. For example, the AI processor receives the input data sets 1 through 3 and the audio data sets 1 through 3 from the client devices 1 and 2 via the computer network 142 and stores the input data sets 1 through 3 and the audio data sets 1 through 3 within the memory device 204. The game engine is coupled to the inferred training engine.

The AI processor includes a feature extractor, a classifier, and an AI model. For example, the AI processor includes a first integrated circuit that applies functionality of the feature extractor, a second integrated circuit that applies functionality of the classifier, and a third integrated circuit that applies functionality of the AI model. As another example, the AI processor executes a first computer program to apply the functionality of the feature extractor, a second computer program that applies the functionality of the classifier, and a third computer program that applies the functionality of the AI model. The feature extractor is coupled to the classifier, which is coupled to the AI model.

The feature extractor extracts, such as determines, parameters, such as one or more amplitudes and one or more frequencies and one or more sense directions, from the audio data sets 1 through 3. For example, the feature extractor determines magnitudes or peak-to-peak amplitudes or zero-to-peak amplitudes of the audio data sets 1 through 3 and frequencies of the audio data sets 1 through 3. To illustrate, the feature extractor determines an absolute maximum power of the audio data set 1 or an absolute minimum power of the audio data set 1 to determine a magnitude of the audio data set 1. In the illustration, an absolute power is a magnitude within an entire time period for which the audio data set 1 is generated. As another illustration, the feature extractor determines a local maximum magnitude of the audio data set 1 and a local minimum magnitude of the audio data set 1. In the illustration, a local magnitude is a magnitude within a pre-determined time period and the pre-determined time period is less than the entire time period for which the audio data set 1 is generated. In the illustration, multiple local maximum magnitudes and multiple local minimum magnitudes are determined from the audio data set 1, and a best fit or an average or a median is applied by the feature extractor to the local maximum magnitudes and the local minimum magnitudes to determine a maximum magnitude and a minimum magnitude.

As another illustration, the feature extractor determines a first time at which the audio data set 1 reaches a pre-determined magnitude and a second time at which the audio data set 1 reaches the same pre-determined magnitude, and calculates a difference between the first and second times to determine a time interval. The feature extractor inverts the time interval to determine an absolute frequency of the audio data set 1. In the illustration, the absolute frequency is a frequency within the entire time period for which the audio data set 1 is generated. As yet another illustration, the feature extractor determines a local frequency of the audio data set 1. In the illustration, a local frequency is a frequency within a pre-determined time period and the pre-determined time period is less than the entire time period for which the audio data set 1 is generated. In the illustration, multiple local frequencies are determined from the audio data set 1, and a best fit or an average or a median is applied by the feature extractor to the local frequencies to determine a frequency. In the illustration, each local frequency is determined in the same manner in which the absolute frequency is determined except the local frequency is determined for each pre-determined time period.

As another illustration, the feature extractor determines a direction in which the audio data set 1 is sensed. In the illustration, the microphone M1 includes an array, such as a linear array, of transducers arranged in a direction. In the illustration, the array includes a proximate transducer and a distal transducer. In the illustration, when the proximate transducer outputs a first portion of the audio data 1 and the distal transducer outputs a second portion of the audio data 1, and the first portion has a greater amplitude than the second amplitude, the feature extractor determines that the object 108M (FIG. 1A-1) within the environment 102 (FIG. 1A-1) is closer to the proximate transducer than to the distal transducer. In the illustration, the feature extractor further determines that the object 108M is in a direction facing the proximate transducer. As another illustration, on the other hand, when the second amplitude is greater than the first amplitude, the feature extractor determines that the object 108M is closer to the distal transducer than to the proximate transducer. In the illustration, the feature extractor further determines that the object 108M is in a direction facing the distal transducer. A direction in which an audio data set is sensed is sometimes referred to herein as a sense direction.

The classifier classifies the parameters obtained from sounds associated with the environments 102, 116, 152, and 158 based on the input data sets 1 through 3. For example, the classifier determines a combination of objects within an environment system, such as the environment 102 (FIG. 1A-1) or the outside environment 116 (FIG. 1A-1) or a combination of the environments 102 and 116, and establishes an association, such as a one-to-one correspondence or a unique relationship, with the parameters determined from the audio data set 1. In the example, the classifier determines arrangements of the objects or states of the objects or a combination of two of more of the objects within the environment, the arrangements of the objects, and the states of the objects. To illustrate, the classifier receives, within the input data set 1, identities of the objects 108A through 108O within the environment 102 and identities of the object 108P, the kid 1 and the kid 2 via the list 150 and the user account 1. In the illustration, the classifier receives, within the input data set 1, states of the objects 108A through 108O (FIG. 1A-1). Further, in the illustration, the classifier determines from a sense direction that the object 108M is arranged to be proximate to the microphone M1 compared to the object 108L and compared to the object 108K (FIG. 1A-1). Also, in the illustration, the classifier determines from a sense direction that the kids 1 and 2 are located away from the microphone M1 compared to the objects 108M, 108L, and 108K to determine an arrangement of the kids 1 and 2 and the objects 108M, 108L, and 108K. As another illustration, the classifier determines from a sense direction, or an amplitude, or a frequency or a combination thereof that the object 108P or the kid 1 or the kid 2 are located outside the environment 102.

As another illustration, the classifier receives, within the input data set 2, identities of the objects 154A through 154N, 108O, 154P, and 154Q within the environment 152 and an identity of the object 154R via a list, such as the list 150, and the user account 1. In the illustration, the classifier receives, within the input data set 2, states of the objects 154A through 154N, 108O, 154P, and 154Q (FIG. 1B). Further, in the illustration, the classifier determines from a sense direction that the object 154D is arranged to be proximate to the microphone M1 compared to the object 154F (FIG. 1B). Also, in the illustration, the classifier determines from a sense direction that the object 154R is flying above the environment 152 to determine an arrangement of the object 154R with respect to the environment 152. As another illustration, the classifier determines from a sense direction, or an amplitude, or a frequency or a combination thereof that the object 154R is located outside the environment 152.

As yet another illustration, the classifier receives, within the input data set 3, identities of the objects 154A through 154N, 108O, 154P, and 154Q within the environment 152 and an identity of the object 154R via a list, such as the list 150, and the user account 2. In the illustration, the classifier receives, within the input data set 3, states of the objects 154A through 154N, 108O, 154P, and 154Q (FIG. 1B). Further, in the illustration, the classifier determines from a sense direction that the object 154C is arranged to be proximate to the microphone M2 compared to the object 154E (FIG. 1B).

The AI model is trained based on associations among the parameters and the input data sets 1 through 3 associated with the environments 102, 116, 152, and 158 (FIGS. 1A-1 and 1B). For example, with reference to FIG. 3, the AI model is provided an indication by the classifier of an association 302, such as a link or a one-to-one correspondence, between a set including the amplitude 1, the frequency 1, and the sense direction 1, and a set including a first type of environment, a first combination of objects in the environment of the first type, a first arrangement of the objects, and a first state of the objects. In the example, the AI model receives the amplitude 1, the frequency 1, and the sense direction 1 from the classifier. In the example, the amplitude 1, the frequency 1, and sense direction 1 are determined by analyzing the audio data set 1 that is captured by the microphone M1. In the example, the one or more amplitudes determined from the audio data set 1 is referred to herein as the amplitude 1. Also, in the example, the one or more frequencies determined from the audio data set 1 is referred to herein as the frequency 1, and the direction in which the audio data set 1 is sensed is referred to herein as the sense direction 1. To illustrate, the amplitude 1, the frequency 1, and the sense direction 1 are examples of the parameters of the audio data set 1. Also, in the example, the AI model is provided, by the classifier, the first type of the environment 102, the first combination of the objects in the environment 102 and the outside environment 116, the first state of the objects, and the first arrangement of the objects via the user account 1. To illustrate, the first type of environment includes whether the environment 102 is an indoor environment, such as a room or an open space within a building, or an outdoor environment, such as a park or a concert or a lake. As another illustration, the first combination of the objects include identities of the objects 108A through 108O, such as a can or a display device or speaker or a window. In the illustration, the first arrangement of the objects include that the can is located closer to the microphone M1 compared to the speaker and the first state includes that the can is open or closed. As another illustration, the first combination of the objects includes identities of the objects 108A through 108O, such as a window with blinds or a carpet or a speaker. Also, in the example, a combination of the environment 102 and the outside environment 116 is referred to as a first environment system.

Figures 1, 1A, 2, 3:
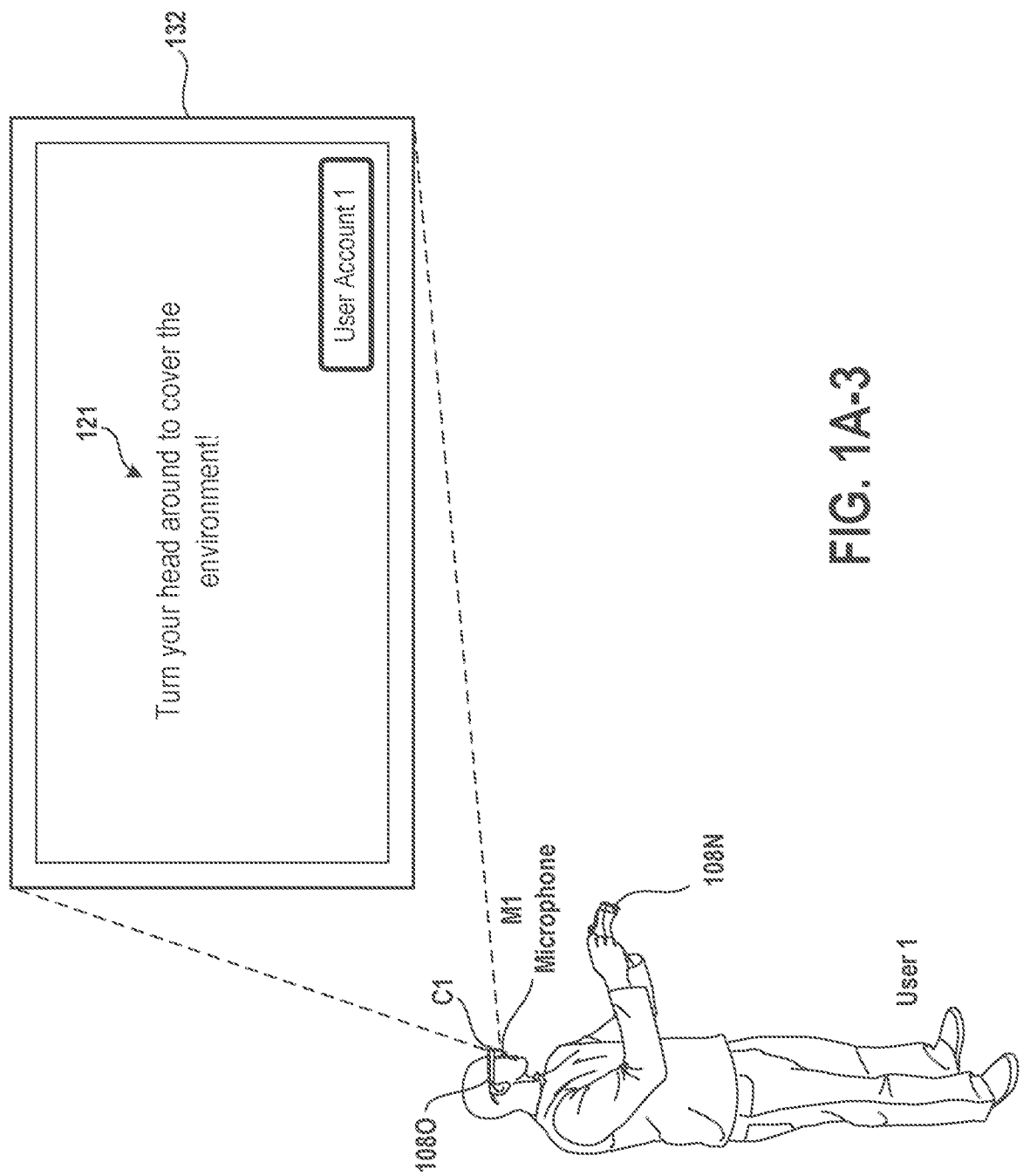
Figure 2:
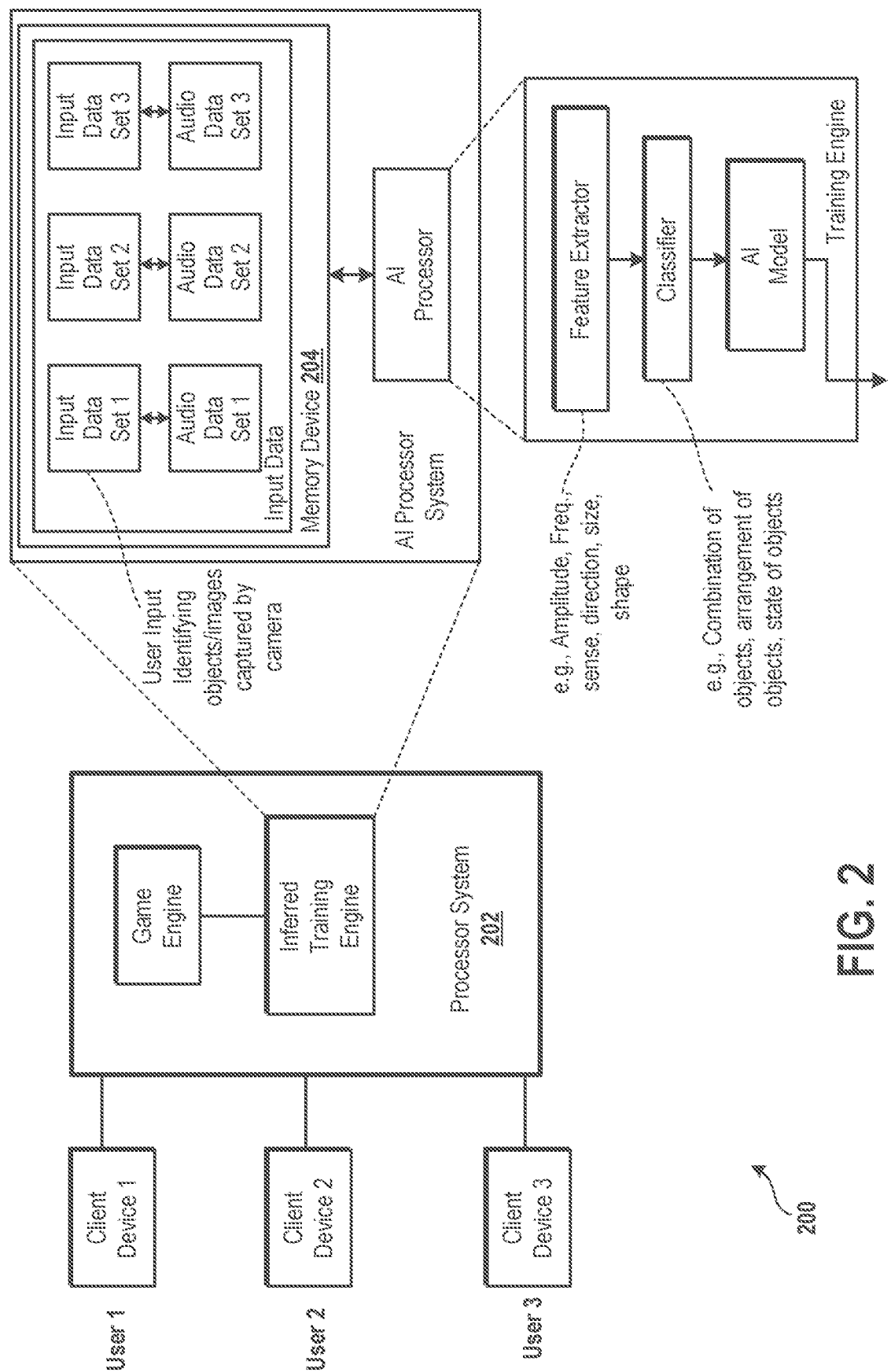
Figure 3:
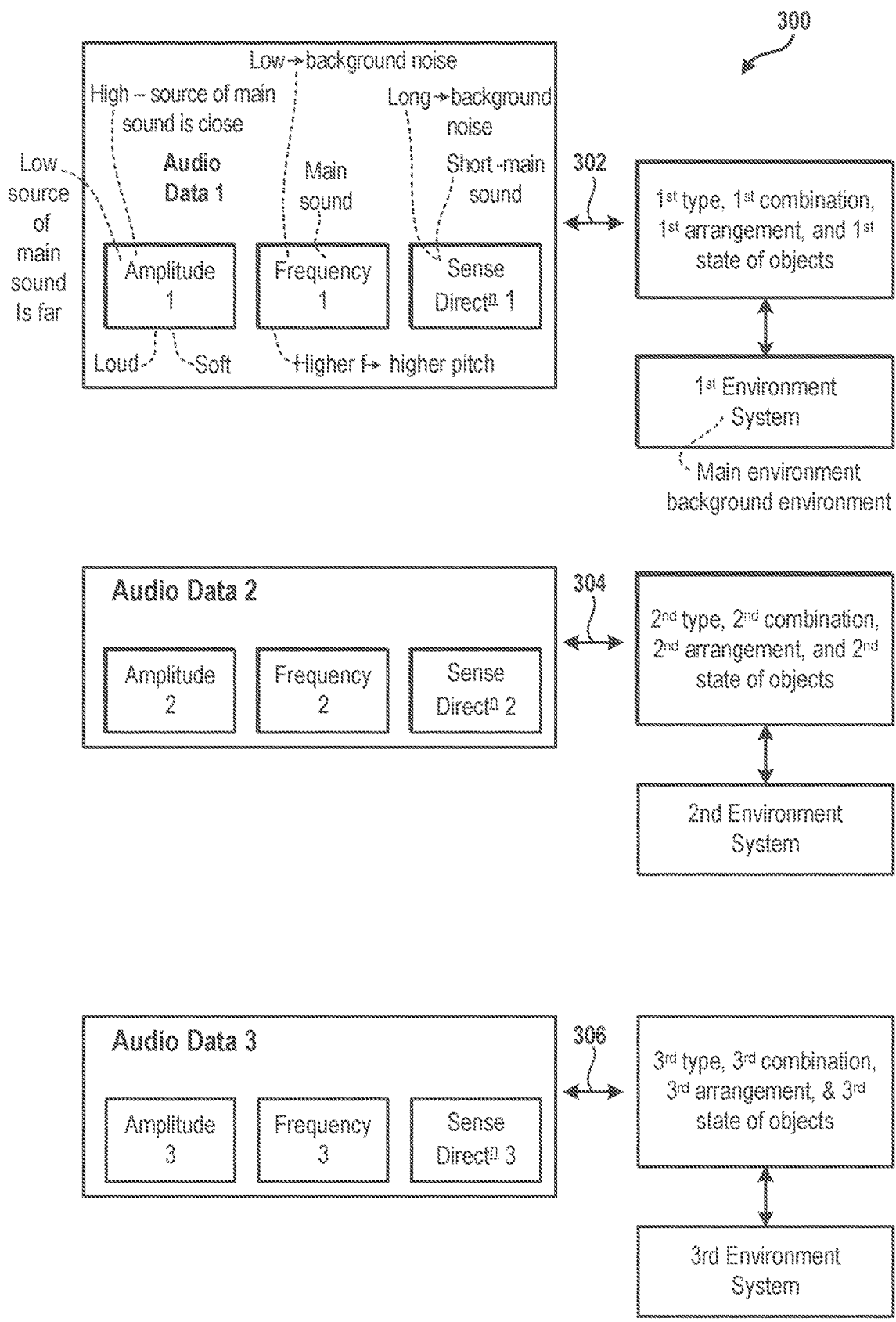

As another example, with reference to FIG. 3, the AI model is provided an indication of association 304, such as a link or a one-to-one correspondence, between a set including an amplitude 2, a frequency 2, and a sense direction 2 and a set including a second type of environment, a second combination of objects in the environment of the second type, a second arrangement of the objects, and a second state of the objects. In the example, the AI model receives the amplitude 2, the frequency 2, and the sense direction 2 from the classifier. In the example, the amplitude 2, the frequency 2, and sense direction 2 are determined by analyzing the audio data set 2 that is captured by the microphone M1. Also, in the example, the one or more amplitudes determined from the audio data set 2 is referred to herein as the amplitude 2, the one or more frequencies determined from the audio data set 2 is referred to herein as the frequency 2, and the direction in which the audio data set 2 is sensed is referred to herein as the sense direction 2. To illustrate, the amplitude 2, the frequency 2, and the sense direction 2 are examples of the parameters of the audio data set 2. Also, in the example, the AI model is provided, by the classifier, the second type of the environment 152, the second combination of the objects in the environment 152 and the outside environment 158, the second state of the objects, and the second arrangement of the objects. In the example, the second type, the second combination, the second state, and the second arrangement are received via the user account 1. To illustrate, the second type of environment includes whether the environment 152 is an indoor environment, such as a room or an open space within a building, or an outdoor environment, such as a park or a concert or a lake. As another illustration, the second combination of the objects include identities of the objects 154A through 154N, 108O, 154P through 154T, such as a can or a display device or speaker or a floor or a ceiling. In the illustration, the second arrangement of the objects include that the object 154G is located closer to the microphone M1 compared to the object 154F and the second state includes that the object 154G is open or closed. As another illustration, the second arrangement includes that the object 154B is away from the microphone M1 compared to the object 154F or 154D (FIG. 1B). In the illustration, the object 154B is the display device that is emitting sound of a video game or another application. Also, in the example, a combination of the environment 152 and the outside environment 158 is referred to as a second environment system.

As yet another example, with reference to FIG. 3, the AI model is provided an indication by the classifier of an association 306, such as a link or a one-to-one correspondence, between a set including an amplitude 3, a frequency 3, and a sense direction 3, and a set including a third type of environment, a third combination of objects in the environment of the third type, a third arrangement of the objects, and a third state of the objects. In the example, the AI model receives the amplitude 3, the frequency 3, and the sense direction 3 from the classifier. In the example, the amplitude 3, the frequency 3, and sense direction 3 are determined by analyzing the audio data set 3 that is captured by the microphone M2. Also, in the example, the one or more amplitudes determined from the audio data set 3 is referred to herein as the amplitude 3, the one or more frequencies determined from the audio data set 3 is referred to herein as the frequency 3, and the direction in which the audio data set 3 is sensed is referred to herein as the sense direction 3. To illustrate, the amplitude 3, the frequency 3, and the sense direction 3 are examples of the parameters of the audio data set 3. Also, in the example, the classifier provides the AI model with the third type of the environment 152, the third combination of the objects in the environment 152 and the outside environment 158, the third state of the objects, and the third arrangement of the objects. In the example, the third type, the third combination, the third state, and the third arrangement are received via the user account 2. To illustrate, the third type of environment includes whether the environment 152 is an indoor environment, such as a room or an open space within a building, or an outdoor environment, such as a park or a concert or a lake. As another illustration, the third combination of the objects include identities of the objects 154A through 154N, 108O, 154P through 154T, such as a can or a display device or speaker or a floor or a ceiling. In the illustration, the third arrangement of the objects include that the object 154T is located closer to the microphone M2 compared to the object 154E or 154C and the third state includes that the object 154T is open or closed. Also, in the example, a combination of the environment 152 and the outside environment 158 is referred to as a third environment system.

In an embodiment, instead of or in addition to receiving identities, such as the list 150 (FIG. 1A-4), of objects within an environment system, image data, such as image frames, of the environment system is received from the cameras C1 and C2. In the embodiment, the feature extractor identifies objects within the environment system from the image data.

For example, the feature extractor identifies the objects 108A through 108P from the image frames of the input data set 1. In the example, the feature extractor determines that an outline of the object 108A matches a pre-stored outline of a chair to determine that the object 108A is a chair. In the example, the pre-stored outline is stored in one or more of the memory devices 1 through N. In the example, the feature extractor compares a size and shape of the object 108O with a pre-stored size and a pre-stored shape of a pre-stored eyeglass to determine that the object 108O is the eyeglass 120. In the example, the pre-stored size, the pre-stored shape, and an identification of the pre-stored eyeglass are stored in the memory device 204. In the example, the identification of the pre-stored eyeglass includes alphanumeric characters. In the example, the feature extractor provides the identities of the objects within the environment system to the AI model.

In one embodiment, the feature extractor identifies arrangements and graphical parameters, such as colors, intensities, shades, and textures, of objects within an environment system, from the image data received from the cameras C1 and C2. For example, the feature extractor determines positions of the objects 108A through 108P with respect to each other and the graphical parameters of the objects 108A through 108P. The arrangements and the graphical parameters are stored in one or more of the memory devices 1 through N of the server system 136.

In one embodiment, instead of a processor, an application specific integrated circuit (ASIC) or a programmable logic device (PLD) or a central processing unit (CPU) or a combination of a CPU and a GPU is used.

In an embodiment, instead of the game engine, an engine of another application, such as a video conferencing application, is used.

In one embodiment, the classifier receives, from the feature extractor, identities of the objects 108A through 108O within the environment 102. The identities of the objects 108A through 108O are determined by the feature extractor from the images captured by the camera C1 and the user account 1. The images captured by the camera C1 are a part of the input data set 1. Similarly, the classifier receives, from the feature extractor, identities of the objects 154A through 154N, 108O, 154P through 154Q, 154S and 154T within the environment 152. The identities of the objects 154A through 154N, 108O, 154P through 154Q, 154S and 154T are determined by the feature extractor from the images captured by the camera C1 and the user account 1. The images captured by the camera C1 are a part of the input data set 2. Also, the classifier receives, from the feature extractor, identities of the objects 154A through 154N, 108O, 154P through 154Q, 154S and 154T within the environment 152. The identities of the objects 154A through 154N, 108O, 154P through 154Q, 154S and 154T are determined by the feature extractor from the images captured by the camera C2 and the user account 2. The images captured by the camera C2 are a part of the input data set 3.

FIG. 3 is a diagram of an embodiment of a system 300 for illustrating the associations 302, 304, and 306. The system 300 includes the audio data sets 1 through 3.

FIG. 4A is a diagram of an embodiment of states 400 of objects. For example, a state of a floor is whether the floor is fabricated from carpet or from tiles or from concrete. As another example, a state of window blinds is whether the window blinds are open or closed. As yet another example, a state of a container is whether the container is open or close.

FIG. 4B is a diagram of an embodiment of types 402 of objects. For example, a type of an object provides an identity of the object. To illustrate, a vehicle is a type of an object, a monitor is a type of an object, a display device is a type of an object, an external speaker is a type of an object, a human, such as a kid or a spectator or a user, is a type of an object, a house is a type of an object, a building is a type of an object, a carpet is a type of an object, a bare floor is a type of an object, a wall is a type of an object, and a window is a type of an object. An example of each object 108K (FIG. 1A-1), 108L (FIG. 1A-1), 154E (FIG. 1B), and 154F (FIG. 1B) is an external speaker. To illustrate, the external speaker is not integrated within another device, such as a display device, and is located outside the display device.

Figure 5A:
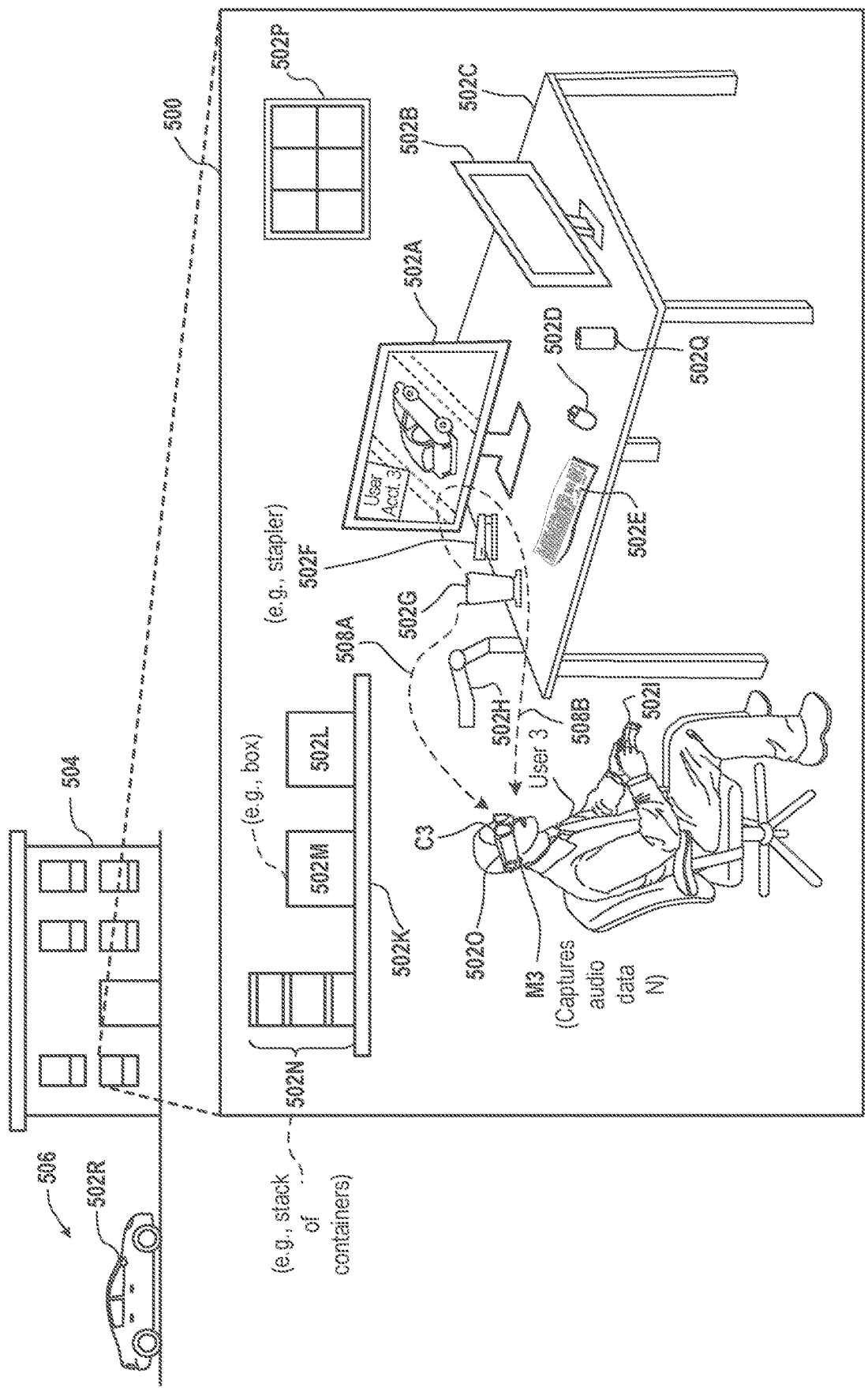
FIG. 5A is a diagram of an embodiment of an environment to illustrate use of the AI model to identify objects within an environment, and to determine states of the objects within the environment and arrangement of the objects within the environment.

FIG. 5A is a diagram of an embodiment of an environment 500 to illustrate use of the AI model to identify objects within the environment 500, and to determine states of the objects within the environment 500 and arrangement of the objects within the environment 500. The environment 500 is a room within a house 504. The environment 500 includes the user 3, who is an example of an object. The environment 500 further includes an object 502A, an object 502B, an object 502C, an object 502D, an object 502E, an object 502F, an object 502G, an object 502H, an object 502I, an object 502J, an object 502K, an object 502L, an object 502M, an object 502N, an object 502O, an object 502P, and an object 502Q. Examples of the client device 3 (FIG. 2) include the eyeglass that is worn by the user 3, the object 502I, the object 502E, the object 502D, the object 502A, the object 502G, an input controller coupled to the eyeglass, and a combination of two or more thereof.

The object 502A is a display device, which includes a computer. The object 502B is also display device, such as a monitor. The object 502C is a table on which the objects 502A, 502B, 502D, 502E, 502F, and 502G rest. The object 502D is a mouse that is coupled to the object 502A and the object 502E is a keyboard that is coupled to the object 502A. The object 502F is a stapler and the object 502G is a speaker that is coupled to the object 502A. The object 502H is a robotic arm. The object 502I is a hand-held controller that is used by the user 3 to play the game G1. The object 502J is a chair on which the user 3 sits. The object 502K is a shelf on which the objects 502L, 502M, and 502N are supported. The object 502L is a box and the object 502M is another box. The object 502N is a stack of containers. The object 502O is an eyeglass that is worn by the user 3. As an example, the object 502O has the same structure and function as that of the eyeglass 120 (FIG. 1A-2). For example, the object 502O includes a camera C3 and a microphone M3. In the example, the eyeglass 120, which is an example of the object 502O, includes the camera C3 and the microphone M3 instead of the camera C1 and the microphone M1. The object 502P is a window without blinds. The object 502Q is a soda can that is open.

The user 3 accesses the game G1 from the game cloud via the computer network 142 (FIG. 1A-2), and plays the game G1, which has a virtual scene represented on a display screen of the object 502A. For example, the user 3 selects one or more buttons on one or more of the objects 502I, 502D, and 502E to provide authentication information, such as a user name and a password. The object 502I or the objects 502D and 502E send the authentication information to the object 502A, which forwards the authentication information via the computer network 142 to the game cloud. The authentication server of the game cloud determines whether the authentication information is authentic and upon determining so, provides access to a user account 3 and the game program that executes on the game cloud. When the game program is executed by one or more of the processors 1 through N of the game cloud, image frames of the game G1 are generated and encoded to output encoded image frames. The encoded image frames are sent to the object 502A. The object 502A decodes the encoded image frames and provides the image frames to a display screen of the object 502A. The display screen of the object 502A applies a rendering program to the image frames to display images of the virtual scene to further allow the user 3 to play the game G1.

During the play of the game G3, sounds of the game G3 are output from the object 502G. For example, when a virtual object within the virtual scene displayed on the object 502A is a car that is speeding on a virtual ground in the virtual scene, a sound of the car running is output via the object 502G. As an example, the virtual object within the virtual scene displayed on the object 502A is controlled by the user 3 via the object 502I or the objects 502D and 502E. In addition, during the play of the game G1, an object 502R, which is a car near the house 504 makes a sound, such as an engine noise. The car 502R is a part of an outside environment 506, which is located outside the house 504.

The microphone M3 captures audio data, such as audio frames, generated from sounds that are associated with, such as emitted from or reflected from, one or more of the objects located within the environment 500. For example, the microphone M3 captures audio data generated based on sound emitted from the object 502G and received via a path 508A from the object 502G. In the example, the path 508A of sound is a direct path from the object 502G to the microphone M3 and is not incident on any other object between the object 502G and the microphone M3. As another example, the microphone M3 captures sound emitted from the object 502G and received via a path 508B from the object 502G. In the example, the path 508B of sound is an indirect path from the object 502G to the microphone M3. To illustrate, the sound emitted from the object 502G is incident on one or more other objects within the environment 500, such as the object 502A and the object 502C, and is reflected from the one or more other objects towards the microphone M3.

The microphone M3 also captures audio data generated based on sounds, such as background noise, that is emitted from the object 502R located outside the environment 500. As an example, the microphone M3 captures sound emitted from the object 502R and received via a wall or a window of the environment 500.

The microphone M3 captures the sounds associated with, such as emitted from or reflected from, from one or more objects within the environment 500, such as the objects 502A through 502Q, and the background noise emitted from the object 502R within the outside environment 506 to generate audio frames, such as an audio data set N, where N is a positive integer. Encoded audio frames generated based on the audio frames are provided via the computer network 142 to the one or more of the processors 1 through N of the game cloud for processing and for training the AI model. It should be noted that as an example, there is no capture of images of the environment 500 by the camera C3.

The feature extractor extracts, such as determines, the parameters, such as one or more amplitudes and one or more frequencies and one or more sense directions, from the audio data set N in the same manner in which the parameters are determined from the audio data set 1, 2, or 3. For example, the feature extractor determines magnitudes or peak-to-peak amplitudes or zero-to-peak amplitudes of the audio data set N and frequencies of the audio data set N. To illustrate, the feature extractor determines an absolute maximum power of the audio data set N or an absolute minimum power of the audio data set N to determine a magnitude of the audio data set N. As another illustration, the feature extractor determines a local maximum magnitude of the audio data set N and a local minimum magnitude of the audio data set N. As another illustration, the feature extractor determines multiple local maximum magnitudes and multiple local minimum magnitudes, and a best fit or an average or a median is applied by the feature extractor to the local maximum magnitudes and the local minimum magnitudes to determine a maximum magnitude and a minimum magnitude. As another illustration, the feature extractor determines a first time at which the audio data set N reaches a pre-determined magnitude and a second time at which the audio data set N reaches the same pre-determined magnitude, and calculates a difference between the first and second times to determine a time interval. The feature extractor inverts the time interval to determine an absolute frequency of the audio data set N. As yet another illustration, the feature extractor determines a local frequency of the audio data set N. In the illustration, a local frequency is a frequency within a pre-determined time period and the pre-determined time period is less than the entire time period for which the audio data set N is generated. In the illustration, multiple local frequencies are determined from the audio data set N, and a best fit or an average or a median is applied by the feature extractor to the local frequencies to determine a frequency.

As another illustration, the feature extractor determines a direction in which the audio data set N is sensed. In the illustration, the microphone M3 includes an array, such as a linear array, of transducers arranged in a linear direction. The array includes a proximate transducer and a distal transducer. In the illustration, when the proximate transducer outputs a first portion of the audio data N and the distal transducer outputs a second portion of the audio data 1, and the first portion has a greater amplitude than the second amplitude, the feature extractor determines that the object 502G (FIG. 5A) within the environment 500 (FIG. 5A) is closer to the proximate transducer than to the distal transducer. In the illustration, the feature extractor further determines that the object 502G is in a direction facing the proximate transducer.

The one or more amplitudes determined from the audio data set N is referred to herein as an amplitude N. Also, the one or more frequencies determined from the audio data set N is referred to herein as a frequency N, and the direction in which the audio data set N is sensed is referred to herein as a sense direction N.

In one embodiment, the user 3 plays a different game than the game G1.

In an embodiment, the outside environment 506 includes any other number, such as two or three, of objects.

In an embodiment, the object 502O excludes the camera C3.

In one embodiment, parameters are sometimes referred to herein as features.

In an embodiment, instead or in addition to the microphone M3, there are one or more additional microphones, such as a stand-alone microphone, for capturing the sounds emitted from objects within the environment 500 and the sounds emitted from objects located within the outside environment 506. For example, the display device situated on the table within the environment 500 includes an additional microphone.

Figure 5B:
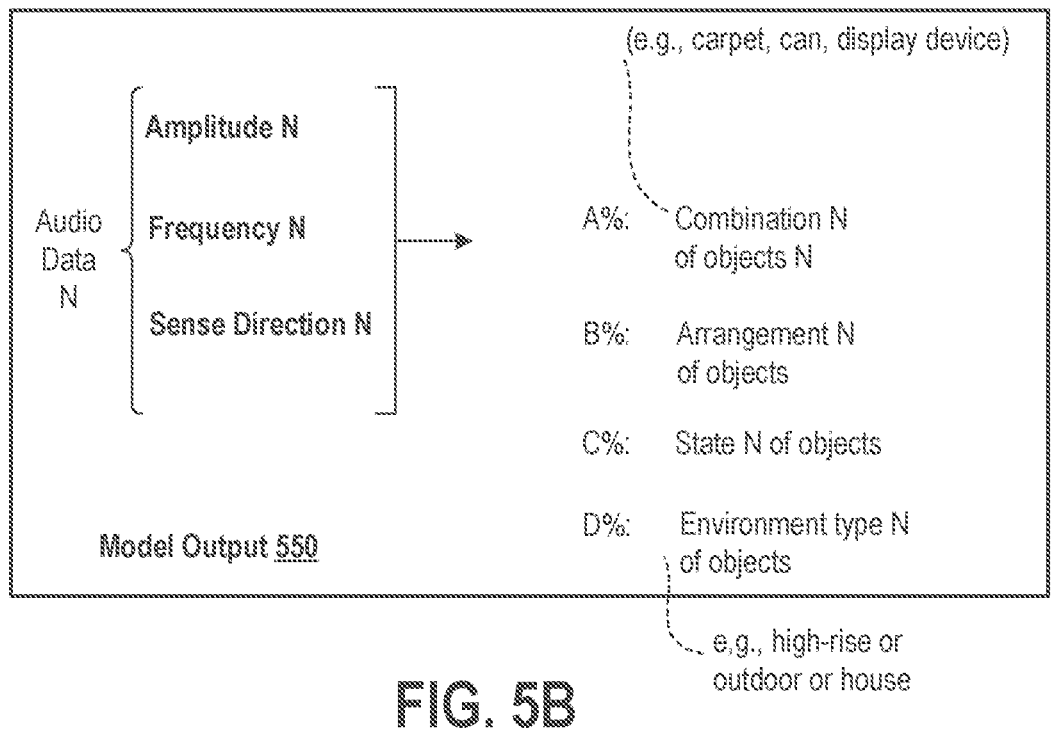
FIG. 5B is a diagram of an embodiment of a model output from the AI model.

FIG. 5B is a diagram of an embodiment of a model output 550. The model output 550 includes a probability A % that the environment 500 includes a combination N of objects, a probability B % that the objects have an arrangement N, a probability C % that the objects have a state N, and a probability D % that the environment 500 is of a type N, where A, B, C, and D are positive real numbers. As an example, A, B, C and D are equal. As another example, one of A, B, C, and D is unequal to at least one of remaining of A, B, C, and D.

The AI model provides the model output 500 when the AI model is provided the amplitude N, the frequency N, and the sense direction N from the feature extractor. For example, upon determining that the amplitude N is within a pre-determined range from the amplitude 1 and outside the pre-determined range from the amplitude 2, the AI model indicates that there is a greater than 50% probability that the audio data set N is received from a room within a house rather than being received from a room within a building. In the example, the house is an example of the environment type N. To illustrate, the house is an indoor type of environment. As another example, upon determining that the frequency N is within a pre-determined range from the frequency 2 and outside the pre-determined range from the frequency 1, the AI model indicates that there is a greater than 50% probability that the audio data set N is received from a room within a building rather than being received from a room within a house. In the example, the building is an example of the environment type N. To illustrate, the building is an indoor type of environment. As another example, a combination of two or more of the amplitude N, the frequency N, and the sense direction N is used to determine the type N of the environment 500.

As yet another example, upon determining that the sense direction N is within a pre-determined range from the sense direction 1 and outside the pre-determined range from the sense direction 2, the AI model indicates that there is a greater than 50% probability that the audio data set N is output from a speaker that is behind a display device of the environment 500 compared to a speaker that is in front of the display device. Whether the speaker is behind or in front of the display device provides examples of the arrangement N of the speaker and the display device. As another example, a combination of two or more of the amplitude N, the frequency N, and the sense direction N is used to determine the arrangement N of the objects within the environment 500.

As another example, upon determining that the amplitude N is within a pre-determined range from the amplitude 2 and outside the pre-determined range from the amplitude 1, the AI model indicates that there is a greater than 50% probability that there is a window without blinds in the environment 500. In the example, the window without blinds is an example of the combination N of objects or of an object within the environment 500. As another example, a combination of two or more of the amplitude N, the frequency N, and the sense direction N is used to determine the combination N of the objects within the environment 500.

As yet another example, upon determining that the amplitude N is within a pre-determined range from the amplitude 1 and outside the pre-determined range from the amplitude 2, the AI model indicates that there is a greater than 50% probability that a pre-determined number of speakers in the environment 500. In the example, the pre-determined number of speakers is an example of the combination N of objects within the environment 500.

As still another example, upon determining that the amplitude N is within a pre-determined range from the amplitude 1 and outside the pre-determined range from the amplitude 2, the AI model indicates that there is a greater than 50% probability that blinds of a window in the environment 500 are open or that the window has no blinds. In the example, the blinds being open or close is an example of the state N of an object within the environment 500. As another example, a combination of two or more of the amplitude N, the frequency N, and the sense direction N is used to determine the state N of an object within the environment 500.

As yet another example, upon determining that the frequency N is within a pre-determined range from the frequency 1 and outside the pre-determined range from the frequency 2, the AI model indicates that there is a greater than 50% probability that there a soda can in the environment 500 is open. In the example, the soda can being open in the environment 500 is an example of the state N of an object within the environment 500.

In an embodiment, the server system 136 (FIG. 7) receives an input via the user account 3 and either the object 502I or the objects 502D and 502E. The input is generated by the object 502I or the objects 502D and 502E or an input controller coupled to the object 502O when the user 3 makes one or more selections on the object 502I or the objects 502D and 502E or the input controller to indicate that the user 3 wishes to identify objects in the environment 500. In the embodiment, the user 3 is wearing the HMD. The input is sent from object 502I or the objects 502D and 502E or the input controller via the object 502O or the object 502A and the computer network 142 to the server system 136. Upon receiving the input requesting the identities of the objects in the environment 500, the server system 136 applies the AI model to obtain the probabilities A %, B %, C % and D % regarding the combination N, the arrangement N, the state N, and the type N of the environment 500, and the probabilities with the combination N, the arrangement N, the state N, and the type N via the computer network 142 to the object 502O or the object 502A. The object 502O or the object 502A displays the probabilities and the combination N, the arrangement N, the state N, and the type N of objects within the environment 500 on a display screen of the 502O or the object 502A.

Figure 7:
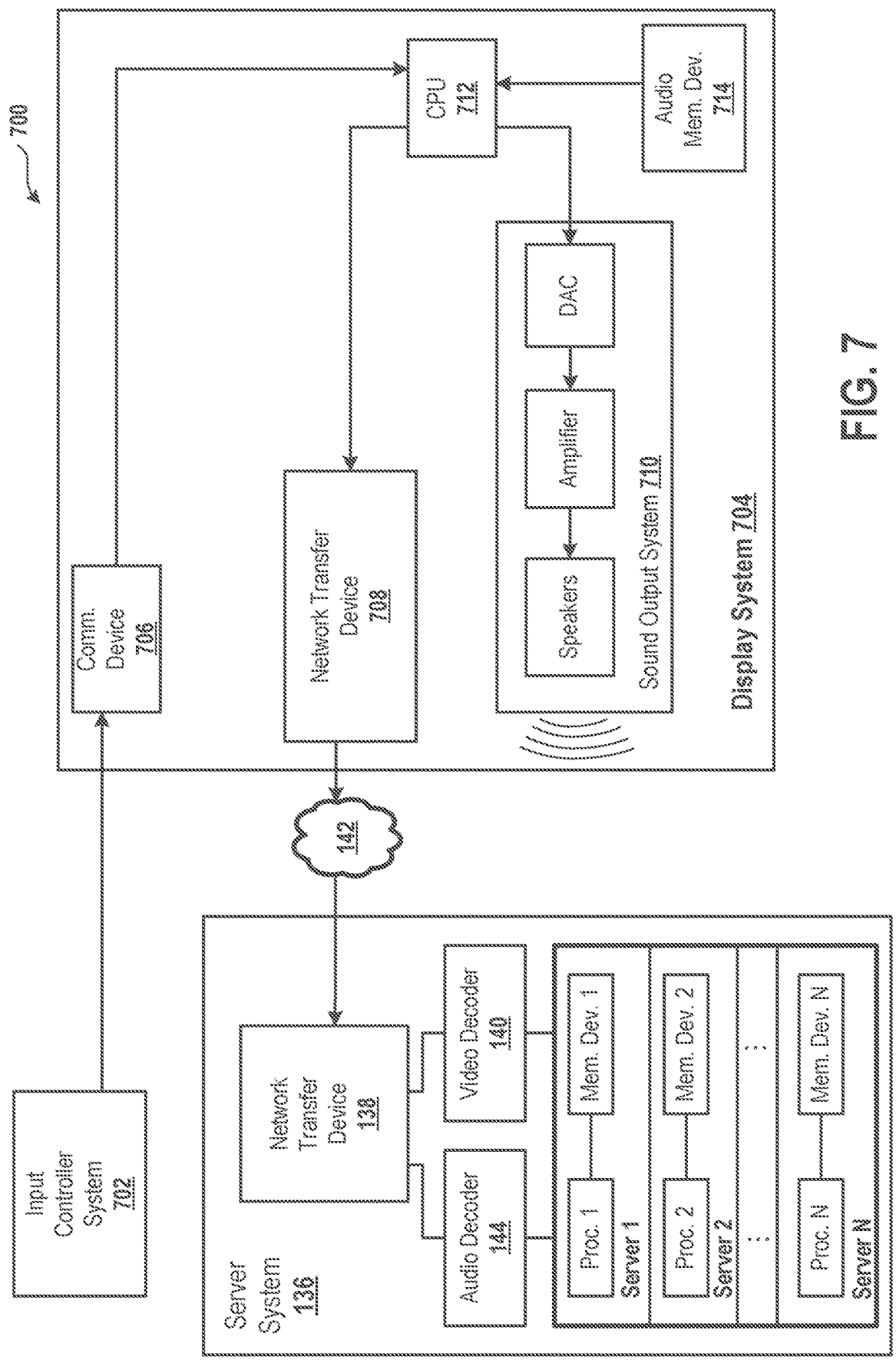
FIG. 7 is a diagram of an embodiment of a system to illustrate the method of FIG. 6.

In one embodiment, the camera C3 captures image data of the environment 500 and sends the image data via the computer network 142 to the server system 136 (FIG. 7). The image data is used to verify the combination N, the arrangement N, the state N, and the type N of the environment 500 as determined by the AI model. The one or more processors 1 through N of the server system 136 verify identities of objects within the environment 500 as determined by the AI model based on the image data. For example, the processor N determines that there is a match between a first identity of the object 502A being a display device and a second identity of the object 502A being the display device. In the example, the first identity is determined by the AI model and the second identity is determined based on the image data. On the other hand, upon determining that the match does not occur, the processor N determines to reapply the AI model to determine a third identity of the object 502A or determines to ignore the first identity and uses the second identity.

Figure 6A:
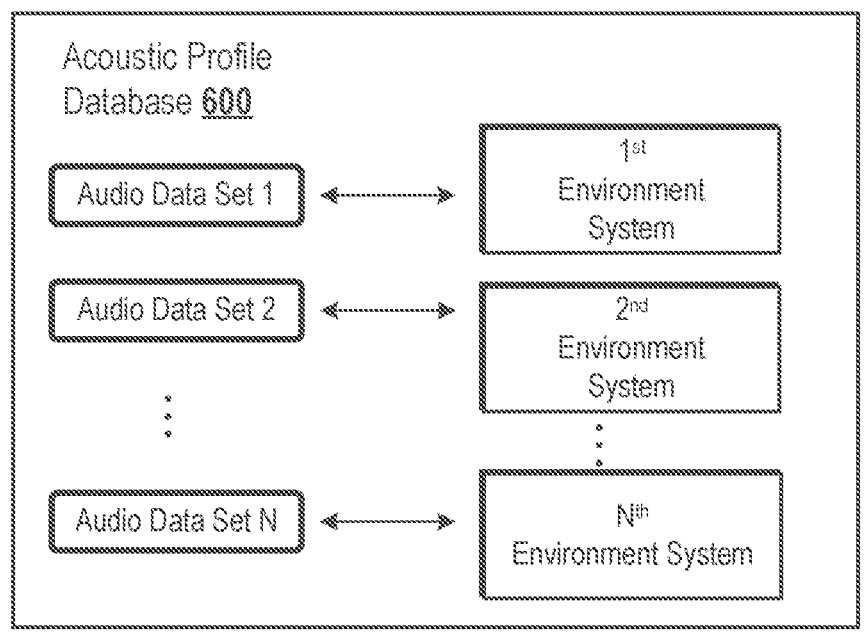
FIG. 6A is a diagram of an embodiment of an acoustic profile database, which is stored in one or more memory devices.

FIG. 6A is a diagram of an embodiment of an acoustic profile database 600, which is stored in one or more of the memory devices 1 through N (FIG. 1A-2). The acoustic profile database 600 includes the audio data set 1, the audio data set 2, and the audio data set N. Also, the acoustic profile database 600 includes the environment systems 1, 2, and N. Furthermore, the acoustic profile database 600 includes correspondences between the audio data sets 1, 2, and N and the environment systems 1, 2, and N. For example, acoustic profile database 600 includes a first exclusive association between the audio data set 1 and the environment system 1, a second exclusive association between the audio data set 2 and the environment system 2, and an Nth exclusive association between the audio data set N and the environment system N. An example of the environment system 1 is the first environment system, an example of the environment system 2 is the second environment system (FIG. 3), and an example of the Nth environment system is the type N of the environment 500 or the environment 500.

Figure 6B:
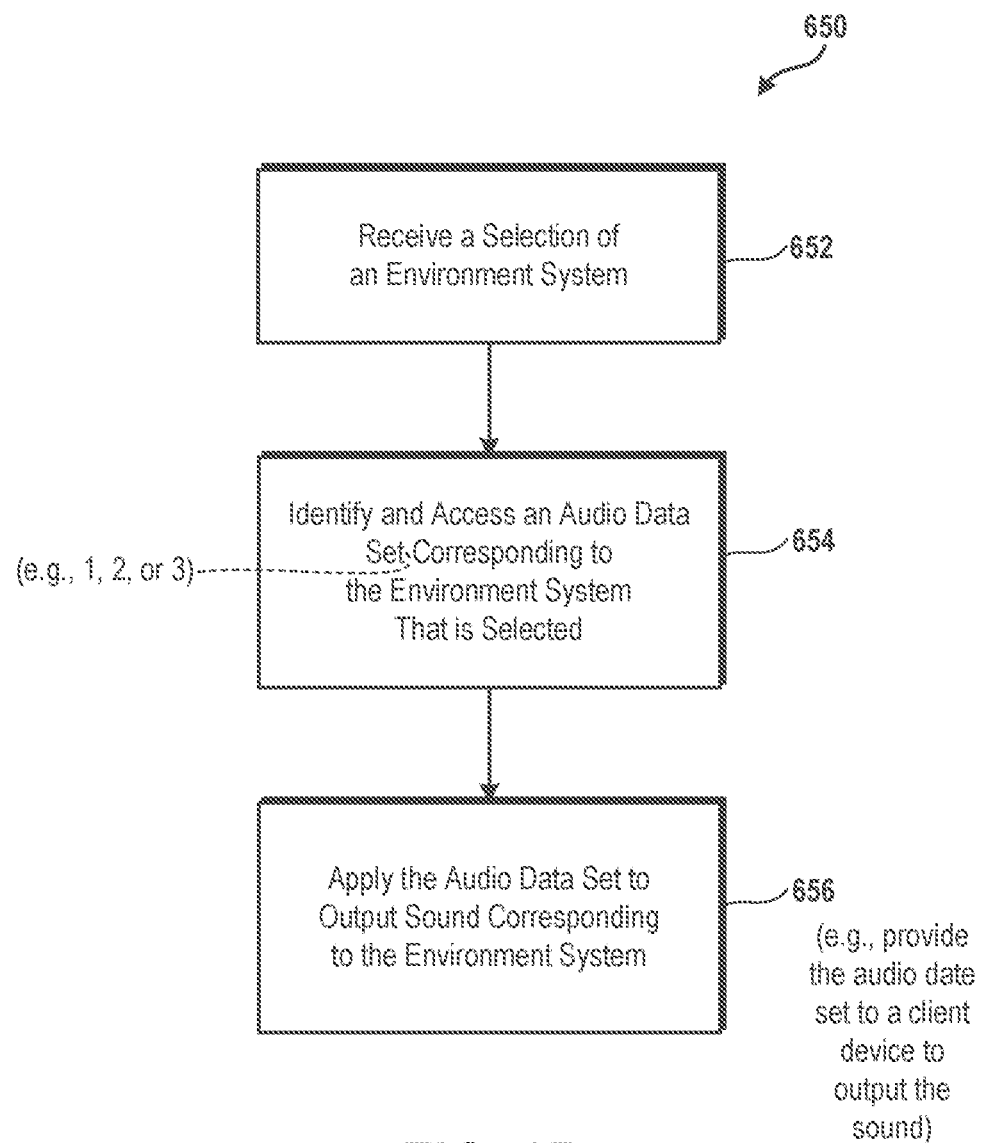
FIG. 6B is a diagram of an embodiment of a method to illustrate an application of audio data to output sound corresponding to an environment system.

FIG. 6B is a diagram of an embodiment of a method 650 to illustrate an application of audio data to output sound corresponding to an environment system. The method 650 is executed by one of more of the processors 1 through N (FIG. 1A-2) or by a processor of the game console 112 (FIG. 1A-1) or a combination thereof. The method 650 includes an operation 652 of receiving a selection of an environment system to be simulated, such as presented, to the user 3. For example, the user 3 selects via the object 502I or a combination of the objects 502E and 502D, the environment system N that corresponds to a sound that the user 3 prefers to hear. In the example, the user 3 is located in a different environment than the environment 500. To illustrate, the object 502P has blinds or the object 502B (FIG. 5A) is removed from the environment 500 to generate the different environment. In the example, the user 3 accesses the game program of the game G1 or another application program of another application from the game cloud. To illustrate, one or more image frames of one or more virtual scenes are generated and displayed on the object 502A when the game program or the other application is executed by one or more of the processors 1 through N. Further, in the example, during or before execution of the game program or the other application program, the user 3 selects the environment system N. In the example, an indication of the selection of the environment system N is sent from the object 502A via the computer network 142 to the server system 136 (FIG. 1A-2). The one or more processors 1 through N receive the indication of the selection and access the database 600 to determine that the audio data set N is exclusively associated with the environment system N.

In an operation 654 of the method 650, the one or more processors 1 through N access, such as read, the audio data set N from the database 600. In an operation 656 of the method 600, the one or more processors 1 through N apply the audio data set N to output sound corresponding to the environment system N to be simulated to the user 3. For example, the one or more processors send the audio data set N via the computer network 142 to the object 502A. The object 502A outputs the sound generated based on the audio data set N during the play of the game G1 or during execution of the other application program. The sound is output via a speaker of the object 502A or via the object 502G. When the sound is output to simulate the environment system N, the user 3 feels as if he/she is in the environment system N instead of the different environment.

FIG. 7 is a diagram of an embodiment of a system 700 to illustrate the method 600 (FIG. 6). The system 700 includes an input controller system 702, a display system 704, the server system 136, and the computer network 142. The display system 704 includes a communication device 706, a network transfer device 708, a CPU 712, a sound output system 710, and an audio memory device 714. An example of the display system 704 is the object 502O (FIG. 5A). Another example of the display system 704 is the object 502A (FIG. 5A). An example of the input controller system 702 is the input controller 122 (FIG. 1A-2). Another example of the input controller system 702 is the hand-held controller. Yet another example, of the input controller system 702 is a combination of a mouse and a keyboard.

The communication device 706 has the same structure as that of the communication device 134 (FIG. 1A-2) and has similar functionality as that of the communication device 134. Also, the network transfer device 708 has the same structure as that of the network transfer device 126 (FIG. 1A-2) and has similar functionality as that of the network transfer device 126. Moreover, the CPU 712 has the same structure as that of the CPU 135 (FIG. 1A-2) and has similar functionality as that of the CPU 135. An example of the audio memory device 714 is a buffer for storing audio data. The sound output system 710 includes a digital-to-analog converter (DAC), an amplifier, and speakers.

The communication device 706 is coupled to the input controller system 702 and to the CPU 712. The CPU 712 is coupled to the network transfer device 708, which is coupled via the computer network 142 to the server system 136. The CPU 712 is coupled to the DAC, which is coupled to the amplifier. The amplifier is coupled to the speakers. The CPU 712 is coupled to the audio memory device 714.

With reference to FIG. 6, in the operation 652, the input controller system 702 generates an input signal, such as an indication, in response to the selection of the environment system N by the user 3. The user 3 uses the input controller system 702 to select one or more buttons on the input controller system 702. A communication device of the input controller 702 applies the communication protocol to the indication of the selection of the environment system N to generate one or more transfer packets and sends the transfer packets to the communication device 706. The communication device 706 applies the communication protocol to the data packets to extract the indication of the selection of the environment system N from the transfer packets and sends the indication to the CPU 712.

The CPU 712 sends the indication of the selection of the environment system N to the network transfer device 708. The network transfer device 708 applies the network transfer protocol to generate data packets including the indication of the selection of the environment system N and sends the data packets via the computer network 142 to the server system 136. The network transfer device 138 of the server system 136 applies the network transfer protocol to the data packets to extract the indication of the selection of the environment system N from the data packets and provides the indication to the one or more processors 1 through N. The one or more processors 1 through N perform the operation 654 (FIG. 6B) of identifying and accessing, such as reading, the audio data set N from one or more of the memory devices 1 through N corresponding to the environment system N, and send the audio data set N to the network transfer device 138. As an example, in addition to performing the operation 654, the one or more processors 1 through N access audio files, having audio information, of the game program or the other application program, and provides the audio information to the network transfer device 138. An example of the audio information is audio data of a virtual character of the game G1 jumping when the virtual character jumps. Another example of the audio information is a user providing a commentary during a Youtube™ video on a sporting event, such as a basketball game, when the other application program is Youtube™. In the example, the sporting event is an example of a context.

The network transfer device 138 applies the network transfer protocol to generate data packets from the audio data set N, and sends the data packets via the computer network 142 to the display system 704 for application of the audio data set N in the operation 656 (FIG. 6B). For example, the network transfer device 138 embeds the audio data set N within the data packets, and sends the data packets via the computer network 142 to the network transfer device 708. In the example, the network transfer device 708 applies the network transfer protocol to the data packets to obtain the audio data set N and sends the audio data set N to the CPU 712. The CPU 712 provides the audio data set N to the DAC, which converts the audio data set N from a digital format to an analog format to output an analog audio signal N. The DAC provides the analog audio signal N to the amplifier. The amplifier amplifies, such as increases or decreases, amplitudes of the analog audio signal N to output an amplified audio signal. The speakers convert electrical energy of the analog audio signal N into sound energy to output sounds of the environment system N based on the audio data set N to simulate the environment system N in the environment 500.

As another example, the network transfer device 138 embeds the audio data set N and the audio information associated with the game program or the other application program within the data packets, and sends the data packets via the computer network 142 to the network transfer device 708. In the example, the network transfer device 708 applies the network transfer protocol to the data packets to obtain the audio data set N and the audio information and sends the audio data set N and the audio information to the CPU 712. The CPU 712 provides the audio data set N and the audio information to the DAC, which converts the audio data set N and the audio information from a digital format to an analog format to output an analog audio signal. The DAC provides the analog audio signal to the amplifier. The amplifier amplifies, such as increases or decreases, amplitudes of the analog audio signal to output an amplified audio signal. The speakers convert electrical energy of the analog audio signal into sound energy to output a first set of sounds of the game G1 or the other application and a second set of sounds of the environment system N as background to the first set of sounds. In the example, the first and second sets are blended together when they are being output simultaneously. In the example, a context of the audio information associated with the game program or the other application program and a context of the audio data set N matches. To illustrate, when a Youtube™ video includes a commentary of a sporting event, such as a baseball game, the audio data set N represents sounds made during a sporting event, such as a baseball game. In the example, the baseball game is an example of a context.

In an embodiment, one or more of the processors 1 through N determine to not provide the audio information corresponding to a virtual scene of the game G1 or to a video of the other application program. For example, instead of accessing, from one or more of the memory devices 1 through N, the audio information of a virtual character jumping in a virtual scene to be output with the virtual scene, one or more of the processors 1 through N access the audio data set N from one or more of the memory devices 1 through N and provide the audio data set N to be applied with the virtual scene. As another example, instead of accessing, from one or more of the memory devices 1 through N, the audio information to be output with a Youtube™ video, one or more of the processors 1 through N access the audio data set N one or more of the memory devices 1 through N and provide the audio data set N to be applied with the Youtube™ video. As yet another example, one or more of the processors 1 through N stop applying the audio information of a virtual character jumping in a virtual scene, and instead apply the audio data set N. As still another example, one or more of the processors 1 through N stop applying the audio information being output with the Youtube™ video, and instead apply the audio data set N.

In one embodiment, the display system 704 includes additional components, such as a microphone, a display screen, a GPU, an audio encoder, a video encoder, and a display screen. These components have similar structure and similar functionality as that of corresponding components of the eyeglass 120. For example, the microphone of the display system 704 has the same structure as that of the microphone M1 and the display screen of the display system 704 is bigger than the display screen 132 when the display system 704 is a display device. As another example, the display screen of the display system 704 has the same size as that of the display screen 132 when the display system 704 is an eyeglass, such as the eyeglass 120 (FIG. 1A-2).

Figure 8:
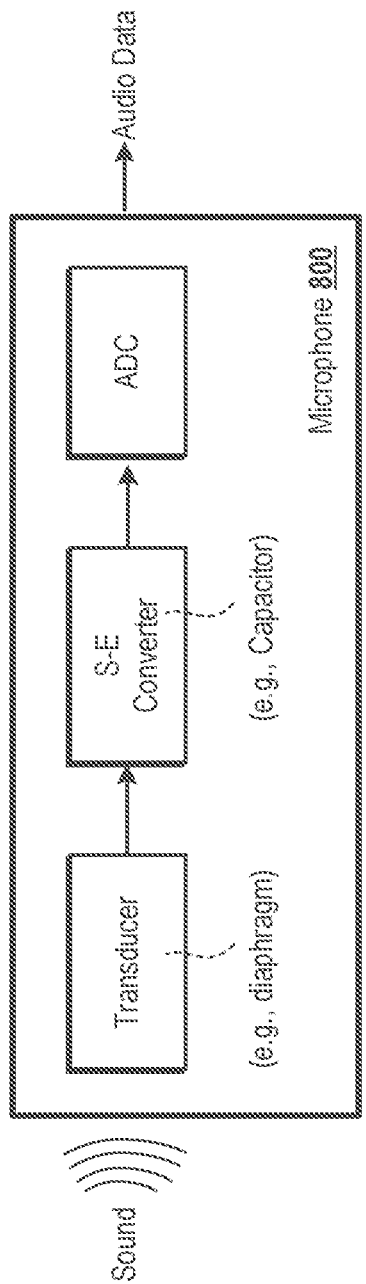
FIG. 8 is a diagram of an embodiment of a system to illustrate a microphone.

FIG. 8 is a diagram of an embodiment of a system 800 to illustrate a microphone 800. The microphone 800 is an example of the microphone M1, or M2, or M3. The microphone 800 includes a transducer, a converter, and an analog-to-digital converter (ADC). The transducer is coupled to a sound energy-to-electrical energy converter (S-E converter), which is coupled to the ADC. An example of the transducer is a diaphragm. An example of the S-E converter is a capacitor or a series of capacitors.

The transducer detects sound that are emitted or reflected or both from objects within an environment to output vibrations. The vibrations are provided to the S-E converter to modify an electrical field generated within the S-E converter to output an audio analog signal, which is an electrical signal. The audio analog signal is provided to the ADC to convert the audio analog signal from an analog form to a digital form to output audio data, such as the audio data set 1 or 2 or 3 or N.

FIG. 9 is a diagram of an embodiment of a system 900 to illustrate a method for using direct audio data to create an effect of the environment system N and using reverb audio data to determine arrangements of objects, and properties of the objects, such as types of materials of the objects and types of surfaces of the objects, in the environment system N. The system 900 includes an audio data separator, the direct audio data, the reverb audio data, the feature extractor, the classifier, and the AI model.

An example of the direct audio data is audio data that is generated by a microphone based on sound that is received via a direct path from a source of the sound. Also, an example of the reverb audio data is audio data that is generated by a microphone based on sound that is received via an indirect path from the source of the sound. To illustrate, a first direct audio data of the audio data set 1 is generated by the microphone M1 (Figure A) based on sound received via the path 106A from the object 108K (FIG. 1A-1). In the illustration, a first reverb audio data of the audio data set 1 is generated by the microphone M1 based on sound received via the path 106B (FIG. 1A-1) from the object 108K. As another illustration, the reverb audio data is generated based on sounds that are reflected or diffused from objects in an environment system.

The audio data separator is implemented as hardware, or software, or a combination thereof. For example, the audio data separator is a computer program and functionality of the computer program is executed by one or more of the processors 1 through N (FIG. 1A-2). As another example, the audio data separator is an ASIC or a PLD.

The audio data separator is coupled to the feature extractor and the audio decoder 144 of the server system 136 (FIG. 7). For example, the audio data separator is coupled between the feature extractor and the audio decoder 144.

The audio data separator receives the audio data sets 1, 2, 3, and N from the client devices 1 and 2 (FIG. 2) via the computer network 142, the network transfer device 138, and the audio decoder 144 (FIG. 7). The audio data separator determines the parameters of the audio data sets 1, 2, 3, and N and identifies, based on the parameters, the direct audio data and the reverb audio data within each of the audio data sets 1, 2, 3, and N. For example, the audio data separator identifies within the audio data set 1, the first direct audio data and the first reverb audio data and identifies within the audio data set 2, a second direct audio data and a second reverb audio data. To illustrate, the audio data separator determines that a first portion of the audio data set 1 has a first amplitude that is greater than a second amplitude of a second portion of the audio data set 1. In the illustration, examples of an amplitude include a peak-to-peak amplitude and a zero-to-peak amplitude. Further, in the illustration, the audio data separator determines that the first portion is the first direct audio data and the second portion is the first reverb audio data. As another illustration, the audio data separator determines that the first portion of the audio data set 1 has a first frequency range and the second portion of the audio data set 1 has a second frequency range. Further, in the illustration, the audio data separator determines that the first portion is the first direct audio data and the second portion is the first reverb audio data. The audio data separator determines the parameters of the audio data sets 1, 2, 3, and N in the same manner in which the feature extractor determines the parameters of the audio data sets 1, 2, 3, and N.

The direct audio data that is output from the audio data separator is stored by one or more of the processors 1 through N in the one or more of the memory devices 1 through N (FIG. 7). An operation, which is the similar to the operation 654 (FIG. 6), is performed based on the direct audio data. For example, upon receiving the selection of the environment system N to be simulated to the user 3, one or more of the processors 1 through N access the direct audio data corresponding to the environment system N from the one or more of the memory devices 1 through N. As another example, an operation same as the operation 654 is executed except that the operation is executed on the direct audio data of the audio data set N instead of the audio data set N.

Moreover, an operation, which is the similar to the operation 656 (FIG. 6B) is performed to apply the direct audio data to output sound corresponding to the environment system N. For example, an operation same as the operation 656 is executed except instead of the audio data set N, the direct audio data of the audio data set N is applied. As another example, the direct audio data of the audio data set N is sent from the server system 136 (FIG. 1A-2) to the object 502A or 502O (FIG. 5A). In the example, the object 502A or 502O outputs the sound generated based on the direct audio data of the audio data set N during the play of the game G1 or during execution of the other application program. As yet another example, the direct audio data of the audio data set N is synthesized with the reverb audio data of the audio data set N to output sounds based on the audio data set N. To illustrate, one or more of the processors 1 through N combine the direct audio data of the audio data set N with the reverb audio data of the audio data set N to output the audio data set N. In the illustration, the audio data set N is then applied in the manner described above in the operation 656 to simulate the environment system N to the user 3. As still another example, the direct audio data of the audio data set N is synthesized by one or more of the processors 1 through N with reverb audio data of another audio data set, such as the audio data set 1 or 2 or 3, to generate an additional audio data set. In the example, the additional audio data set is applied in the same manner in which the audio data set N is applied in the operation 656. To illustrate, the additional audio data set is sent from the server system 136 to the object 502A or 502O via the computer network 142 to output sounds based on the additional audio data set.

The reverb audio data that is output from the audio data separator is sent to the feature extractor. For example, the first reverb audio data and the second reverb audio data are sent from the audio data separator to the feature extractor.

The feature extractor determines the parameters of the reverb audio data of any of the audio data sets 1, 2, 3, and N in the same manner in which the feature extractor determines the parameters of the audio data set. For example, the feature extractor determines an amplitude 1a of the reverb audio data of the audio data set 1, an amplitude 2a of the reverb audio data of the audio data set 2, an amplitude 3a of the reverb audio data of the audio data set 3, and an amplitude Na of the reverb audio data of the audio data set N. As another example, the feature extractor determines a frequency 1a of the reverb audio data of the audio data set 1, a frequency 2a of the reverb audio data of the audio data set 2, a frequency 3a of the reverb audio data of the audio data set 3, and a frequency Na of the reverb audio data of the audio data set N. The feature extractor sends the parameters of the reverb audio data of the audio data sets 1, 2, and 3 to the classifier. Also, the feature extractor sends the parameters of the reverb audio data of the audio data set N to the AI model.

The classifier classifies the parameters of the reverb audio data of the audio data sets 1 through 3 based on the input data sets 1 through 3. For example, the classifier determines or identifies a combination of objects within an environment system, such as the environment 102 (FIG. 1A-1) or the outside environment 116 (FIG. 1A-1) or a combination thereof, from the input data set 1 and establishes an association, such as a one-to-one correspondence, of the combination of objects with the parameters of the reverb audio data of the audio data set 1. In the example, the classifier further determines or identifies arrangements of the objects with respect to each other or states of the objects or types of surfaces of the objects or types of materials of the objects or a combination of two of more thereof. In the example, the input data set 1 includes the types of materials of the objects and the types of surfaces of the objects. To illustrate, the classifier receives, within the input data set 1, types of materials of the objects 108A through 108O (FIG. 1A-1) and types of surfaces of the objects 108A through 108O.

Examples of the types of materials include wood or plastic or glass or marble or stainless steel or leather or wool or cloth or cotton or polyester or tile or granite. To illustrate, the list 150 (FIG. 1A-4) includes an entry indicating that the desktop table is made from wood and another entry indicating that the chair is made from leather. In the illustration, the user 1 selects the type of material used to fabricating the desktop table and the type of material used for fabricating the chair in the same manner in which the chair and the desktop table are selected within the list 150 by the user 1. As another illustration, the list 150 includes an entry indicating that the desktop table has an uneven surface or a smooth surface and an entry indicating that a surface of a seat of the chair is intact or worn out, such as about to tear or is torn. In the illustration, the user 1 selects the type of surface of the desktop table and the type of surface of the chair in the same manner in which the chair and the desktop table are selected within the list 150 by the user 1.

As another illustration of the classification, the classifier receives, within the input data set 2, identities of the objects 154A through 154N, 108O, 154P, and 154Q within the environment 152 and an identity of the object 154R via a list, such as the list 150, and the user account 1. In the illustration, the classifier receives, within the input data set 2, states, types of materials, and types of surfaces of the objects 154A through 154N, 108O, 154P, and 154Q (FIG. 1B). Further, in the illustration, the classifier determines from a sense direction of the reverb audio data of the audio data set 2 that the object 154D is arranged to be proximate to the microphone M1 compared to the object 154F (FIG. 1B).

As yet another illustration, the classifier receives, within the input data set 3, identities of the objects 154A through 154N, 108O, 154P, and 154Q within the environment 152 and an identity of the object 154R via a list, such as the list 150, and the user account 2. In the illustration, the classifier receives, within the input data set 3, states, types of materials, and types of surfaces of the objects 154A through 154N, 108O, 154P, and 154Q (FIG. 1B). Further, in the illustration, the classifier determines from a sense direction that the object 154C is arranged to be proximate to the microphone M2 compared to the object 154E (FIG. 1B). In the illustration, the sense direction is determined from the parameters of the reverb audio data of the audio data set 2.

The AI model is trained based on associations among the parameters of the reverb audio data of the audio data sets 1 through 3 and the input data sets 1 through 3 associated with the environments 102, 116, 152, and 158 (FIGS. 1A-1 and 1B). For example, the AI model is provided an indication by the classifier of a first association, such as a link or a one-to-one correspondence, between a set including the amplitude 1a of the reverb audio data of the audio data set 1, the frequency 1a of the reverb audio data of the audio data set 1, and a sense direction 1a of the reverb audio data of the audio data set 1 and a set including the first type of environment, the first combination of objects in the environment of the first type, the first arrangement of the objects, the first state of the objects, a first set of types of materials of the objects, and a first set of types of surfaces of the objects. In the example, the one or more amplitudes determined from the reverb audio data of the audio data set 1 is referred to herein as the amplitude 1a. Also, in the example, the one or more frequencies determined from the reverb audio data of the audio data set 1 is referred to herein as the frequency 1a, and the direction in which the reverb audio data of the audio data set 1 is sensed is referred to herein as the sense direction 1a. To illustrate, the amplitude 1a, the frequency 1a, and the sense direction 1a are examples of the parameters of reverb audio data of the audio data set 1. Also, in the example, the AI model is provided, by the classifier, the first type of the environment 102, the first combination of the objects in the environment 102 and the outside environment 116, the first state of the objects, the first arrangement of the objects, the first set of types of materials of the objects, and the first set of types of surfaces of the objects via the user account 1.

As another example, the AI model is provided an indication of a second association, such as a one-to-one correspondence, between a set including the amplitude 2b, the frequency 2b, and a sense direction 2a of the reverb audio data of the audio data set 2 and a set including the second type of environment, the second combination of objects in the environment of the second type, the second arrangement of the objects, the second state of the objects, a second set of types of materials of the objects, and a second set of types of surfaces of the objects. In the example, the AI model receives the amplitude 2b, the frequency 2b, and a sense direction 2b from the classifier. In the example, the amplitude 2b, the frequency 2b, and sense direction 2b are determined by analyzing the reverb audio data of the audio data set 2 that is captured by the microphone M1. Also, in the example, the one or more amplitudes determined from the reverb audio data of the audio data set 2 is referred to herein as the amplitude 2b, the one or more frequencies determined from the reverb audio data of the audio data set 2 is referred to herein as the frequency 2b, and the direction in which the reverb audio data of the audio data set 2 is sensed is referred to herein as the sense direction 2b. To illustrate, the amplitude 2b, the frequency 2b, and the sense direction 2b are examples of the parameters of the reverb audio data of the audio data set 2. Also, in the example, the AI model is provided, by the classifier, the second type of the environment 152, the second combination of the objects in the environment 152 and the outside environment 158, the second state of the objects, the second arrangement of the objects, the second set of types of materials of the objects, and the second set of types of surfaces of the objects. In the example, the second type, the second combination, the second state, and the second arrangement, the second set of types of materials of the objects, and the second set of types of surfaces of the objects are received via the user account 1.

As yet another example, the AI model is provided an indication by the classifier of a third association, such as a link, between a set including the amplitude 3a, the frequency 3a, and a sense direction 3a of the reverb audio data of the audio data set 3 and a set including the third type of environment, the third combination of objects in the environment of the third type, the third arrangement of the objects, the third state of the objects, a third set of types of materials of the objects, and a third set of types of surfaces of the objects. In the example, the AI model receives the amplitude 3c, the frequency 3c, and the sense direction 3c from the classifier. In the example, the amplitude 3c, the frequency 3c, and sense direction 3c are determined by analyzing the reverb audio data of the audio data set 3 that is captured by the microphone M2. Also, in the example, the one or more amplitudes determined from the reverb audio data of the audio data set 3 is referred to herein as the amplitude 3c, the one or more frequencies determined from the reverb audio data of the audio data set 3 is referred to herein as the frequency 3c, and the direction in which the reverb audio data of the audio data set 3 is sensed is referred to herein as the sense direction 3c. To illustrate, the amplitude 3c, the frequency 3c, and the sense direction 3c are examples of the parameters of the reverb audio data of the audio data set 3. Also, in the example, the classifier provides the AI model with the third type of the environment 152, the third combination of the objects in the environment 152 and the outside environment 158, the third state of the objects, the third arrangement of the objects, the third set of types of materials of the objects, and the third set of types of surfaces of the objects. In the example, the third type, the third combination, the third state, the third arrangement, the third set of types of materials of the objects, and the third set of types of surfaces of the objects are received via the user account 2.

The AI model provides a model output 902 when the AI model is provided the amplitude Na, the frequency Na, and a sense direction Na from the feature extractor. For example, upon determining that the amplitude Na is within a pre-determined range from the amplitude 1a and outside the pre-determined range from the amplitude 2a, the AI model indicates that there is a greater than 50% probability that the reverb audio data of the audio data set N is generated based on a sound that is reflected from a table that is made from plastic or a table that has a smooth top surface. In the example, the probability that the table is made from plastic or has the smooth top surface is an example of the model output 902. As another example, upon determining that the frequency Na is within a pre-determined range from the frequency 2a and outside the pre-determined range from the frequency 1a, the AI model indicates that there is a greater than 50% probability that the reverb audio data of the audio data set N is generated based on sound that is reflected from a table having an uneven surface or a table that has a top surface made from marble. In the example, the probability that the table is made from marble or that the table has the uneven surface is an example of the model output 902. As another example, a combination of two or more of the amplitude Na, the frequency Na, and the sense direction Na is used to determine a type of material of any of the objects within the environment 500 or a type of surface of any of the objects within the environment 500.

It should be noted that a type of material of an object and a type of surface of the object are examples of properties of the object.

In one embodiment, during the operation 654, a visual mapping of a scene of the environment N is created on the display screen 132 (FIG. 1A-2) based on the image data that is captured by the cameras C1 and C2 (FIG. 1B). For example, in addition to applying the direct audio data to simulate the environment system N, the arrangement of objects within the environment system N and the graphical parameters of the objects within the environment system N are applied to simulate the environment system N. To illustrate, the arrangement of objects within the environment system N and the graphical parameters of the objects within the environment system N are accessed by one or more of the processors 1 through N from one or more of the memory devices 1 through N of the server system 136 and sent via the computer network 142 to the eyeglass 120 (FIG. 1A-2). Upon receiving the arrangement of objects within the environment system N and the graphical parameters of the objects within the environment system N, the GPU 130 (FIG. 1A-2) displays the graphical parameters of the objects are displayed according to the arrangements to simulate the environment system N when the user 3 is within the different environment.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for determining a real-world environment in which a first user is located, comprising:
receiving a plurality of sets of audio data generated from sounds emitted in a plurality of real-world environments, wherein each of the plurality of real-world environments has a different combination of objects;
extracting a plurality of features from the plurality of sets of audio data, wherein the plurality of features include a plurality of amplitudes of the plurality of sets of audio data, a plurality of frequencies of the plurality of sets of audio data, and a plurality of sense directions in which the sounds are sensed;

classifying the plurality of features to output associations between the plurality of features and a plurality of types of the plurality of real-world environments, the objects within the plurality of real-world environments, a plurality of arrangements of the objects, and a plurality of states of the objects within the plurality of real-world environments;

receiving input data regarding the plurality of real-world environments;

training an artificial intelligence (AI) model based on the plurality of sets of audio data generated from the sounds in the plurality of real-world environments and based on the input data regarding the plurality of real-world environments, wherein said training the AI model includes:

providing, to the AI model, the associations between the plurality of features and the plurality of types of the plurality of real-world environments, the objects within the plurality of real-world environments, the plurality of arrangements of the objects, and the plurality of states of the objects within the plurality of real-world environments; and determining, by the AI model, a plurality of probabilities based on the associations between the plurality of features and the plurality of types of the plurality of real-world environments, the objects within the plurality of real-world environments, the plurality of arrangements of the objects, and the plurality of states of the objects within the plurality of real-world environments; and applying the AI model to audio data captured from the real-world environment surrounding the first user to determine that a type of the real-world environment in which the first user is located includes one of an indoor environment and an outdoor environment.

2. The method of claim 1, further comprising:
receiving an indication of the type of the real-world environment to be simulated;
accessing, based on the type of the real-world environment to be simulated, the audio data captured from the real-world environment;
providing the audio data captured from the real-world environment to a client device for outputting a sound corresponding to the type of the real-world environment.

3. The method of claim 1, wherein the plurality of sets of audio data include audio data that is generated from sounds emitted from one or more of the objects in the plurality of real-world environments and sounds that reflected from remaining of the objects.

4. The method of claim 1, wherein the input data includes data identifying the objects in the plurality of real-world environments or image data captured by cameras in the plurality of real-world environments or a combination thereof.

5. The method of claim 1, wherein the plurality of sets of audio data is captured when a second user moves from one location to another.

6. The method of claim 1, wherein the plurality of sets of audio data is captured when a plurality of users including a second user and a third user are at a location.

7. The method of claim 1, further comprising applying the AI model to the audio data captured from the real-world environment surrounding the first user to identify one or more objects within the real-world environment surrounding the first user or one or more states of the one or more objects or an arrangement of the one or more objects or a combination thereof.

8. A server for determining a real-world environment in which a user is located, comprising:
a processor configured to:
receive, via a computer network, a plurality of sets of audio data generated from sounds emitted in a plurality of real-world environments, wherein each of the plurality of real-world environments has a different combination of objects;
extract a plurality of features from the plurality of sets of audio data, wherein the plurality of features include a plurality of amplitudes of the plurality of sets of audio data, a plurality of frequencies of the plurality of sets of audio data, and a plurality of sense directions in which the sounds are sensed;
classify the plurality of features to output associations between the plurality of features and a plurality of types of the plurality of real-world environments, the objects within the plurality of real-world environments, a plurality of arrangements of the objects, and a plurality of states of the objects within the plurality of real-world environments;
receive, via the computer network, input data regarding the plurality of real-world environments;
train an artificial intelligence (AI) model based on the plurality of sets of audio data generated from the sounds in the plurality of real-world environments and based on the input data regarding the plurality of real-world environments, wherein to train the AI model, the processor is configured to:
provide, to the AI model, the associations between the plurality of features and the plurality of types of the plurality of real-world environments, the objects within the plurality of real-world environments, the plurality of arrangements of the objects, and the plurality of states of the objects within the plurality of real-world environments; and
determine, using the AI model, a plurality of probabilities based on the associations between the plurality of features and the plurality of types of the plurality of real-world environments, the objects within the plurality of real-world environments, the plurality of arrangements of the objects, and the plurality of states of the objects within the plurality of real-world environments; and
apply the AI model to audio data captured from the real-world environment surrounding the user to determine that a type of the real-world environment in which the user is located includes one of an indoor environment and an outdoor environment; and
a memory device coupled to the processor.

9. The server of claim 8, wherein the processor is configured to:
receive an indication of the type of the real-world environment to be simulated;
access, based on the type of the real-world environment to be simulated, the audio data captured from the real-world environment;
provide the audio data captured from the real-world environment to a client device for outputting a sound corresponding to the type of the real-world environment.

10. The server of claim 8, wherein the plurality of sets of audio data include audio data that is generated from sounds emitted from one or more of the objects in the plurality of real-world environments and sounds that are reflected from remaining of the objects.

11. The server of claim 8, wherein the input data includes data identifying the objects in the plurality of real-world environments or image data captured by cameras in the plurality of real-world environments or a combination thereof.

12. The server of claim 8, wherein the processor is configured to apply the AI model to the audio data captured from the real-world environment surrounding the user to identify one or more objects within the real-world environment surrounding the user or one or more states of the one or more objects or an arrangement of the one or more objects or a combination thereof.

13. A system for determining a real-world environment in which a user is located, comprising:
- a plurality of client devices configured to:
  - generate a plurality of sets of audio data generated from sounds emitted in a plurality of real-world environments, wherein each of the plurality of real-world environments has a different combination of objects; and
  - receive input data regarding the plurality of real-world environments; and
- a server coupled to the plurality of client devices, wherein the server is configured to:
  - receive the plurality of sets of audio data from the plurality of client devices via a computer network;
  - extract a plurality of features from the plurality of sets of audio data, wherein the plurality of features include a plurality of amplitudes of the plurality of sets of audio data, a plurality of frequencies of the plurality of sets of audio data, and a plurality of sense directions of sensing the sounds;
  - classify the plurality of features to output associations between the plurality of features and a plurality of types of the plurality of real-world environments, the objects within the plurality of real-world environments, a plurality of arrangements of the objects, and a plurality of states of the objects within the plurality of real-world environments;
  - receive the input data regarding the plurality of real-world environments from the plurality of client devices via the computer network;
  - train an artificial intelligence (AI) model based on the plurality of sets of audio data generated from the sounds in the plurality of real-world environments and based on the input data regarding the plurality of real-world environments, wherein to train the AI model, the server is configured to:
    - provide, to the AI model, the associations between the plurality of features and the plurality of types of the plurality of real-world environments, the objects within the plurality of real-world environments, the plurality of arrangements of the objects, and the plurality of states of the objects within the plurality of real-world environments; and
    - determine, using the AI model, a plurality of probabilities based on the associations between the plurality of features and the plurality of types of the plurality of real-world environments, the objects within the plurality of real-world environments, the plurality of arrangements of the objects, and the plurality of states of the objects within the plurality of real-world environments; and
  - apply the AI model to audio data captured from the real-world environment surrounding the user to determine that a type of the real-world environment in which the user is located includes one of an indoor environment and an outdoor environment.

14. The system of claim 13, wherein the server is configured to:
- receive an indication of the type of the real-world environment to be simulated;
- access, based on the type of real-world environment to be simulated, the audio data captured from the real-world environment;
- provide the audio data captured from the real-world environment to a client device for outputting a sound corresponding to the type of real-world environment.

* * * * *